US012309646B2

(12) United States Patent
Xiong

(10) Patent No.: US 12,309,646 B2
(45) Date of Patent: May 20, 2025

(54) HANDOVER PROCESS-BASED MESSAGE TRANSMITTING METHOD AND APPARATUS, DEVICE, AND MEDIUM

(71) Applicant: Tencent Technology (Shenzhen) Company Limited, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 390 days.

(21) Appl. No.: 17/984,658

(22) Filed: Nov. 10, 2022

(65) Prior Publication Data
US 2023/0073391 A1 Mar. 9, 2023

Related U.S. Application Data

(63) Continuation of application No. PCT/CN2022/071026, filed on Jan. 10, 2022.

(30) Foreign Application Priority Data

Feb. 25, 2021 (CN) .......................... 202110215380.0

(51) Int. Cl.
*H04W 36/00* (2009.01)
*H04W 36/14* (2009.01)
(52) U.S. Cl.
CPC ... *H04W 36/0044* (2013.01); *H04W 36/0058* (2018.08); *H04W 36/0083* (2013.01); *H04W 36/0085* (2018.08); H04W 36/1443 (2023.05)
(58) Field of Classification Search
None
See application file for complete search history.

(56) References Cited

U.S. PATENT DOCUMENTS

2014/0295849 A1   10/2014   Sirotkin
2016/0353340 A1   12/2016   Yang et al.
(Continued)

FOREIGN PATENT DOCUMENTS

CN   1859760 A     11/2006
CN   102893693 A    1/2013
(Continued)

OTHER PUBLICATIONS

International Search Report and Written Opinion with English translations, Mar. 16, 2022, pp. 1-10, issued in PCT/CN2022/071026, China National Intellectual Property Administration, Beijing, China.
(Continued)

*Primary Examiner* — Eunsook Choi
(74) *Attorney, Agent, or Firm* — Crowell & Moring LLP

(57) ABSTRACT

Handover process-based message transmitting methods and apparatuses for mobile communication are provided. A control parameter of quality of service (QOS) notification control (QNC) of a non-GBR bearer flow is transmitted by a source access network device to a target access network device during a handover process, so that the target access network device transmits a notification message to an application entity via a core network entity in a case that a change in a parameter value of the QNC of the non-GBR bearer flow after the handover is completed meets a reporting condition. The control parameter of the QNC indicates a parameter of the QNC of the non-GBR bearer flow and the reporting condition.

23 Claims, 22 Drawing Sheets

(56) References Cited

U.S. PATENT DOCUMENTS

| | | |
|---|---|---|
| 2018/0077606 A1 | 3/2018 | Godin et al. |
| 2020/0112522 A1 | 4/2020 | Dannebro et al. |
| 2020/0229059 A1 | 7/2020 | Xu et al. |
| 2021/0075864 A1* | 3/2021 | Sun .................. H04L 67/14 |
| 2022/0014475 A1* | 1/2022 | Sun ............... H04W 28/0236 |
| 2022/0038946 A1* | 2/2022 | Kim ............... H04W 28/0284 |
| 2022/0078857 A1* | 3/2022 | Kim ............... H04W 28/0268 |
| 2022/0312509 A1* | 9/2022 | Kim ............... H04W 28/0268 |
| 2024/0334238 A1* | 10/2024 | Kim .................. H04W 36/14 |

FOREIGN PATENT DOCUMENTS

| | | |
|---|---|---|
| CN | 107404454 A | 11/2017 |
| CN | 110049517 A | 7/2019 |
| CN | 110519807 A | 11/2019 |
| CN | 111279744 A | 6/2020 |
| WO | WO 2020/052775 A1 | 3/2020 |
| WO | WO 2020/069742 A1 | 4/2020 |
| WO | WO 2020/114569 A1 | 6/2020 |
| WO | WO 2020/139052 A1 | 7/2020 |
| WO | WO 2020/147927 A1 | 7/2020 |

OTHER PUBLICATIONS

Extended European Search Report, May 22, 2024, pp. 1-12, issued in European Application No. 227586880, European Patent Office, Munich, Germany.

3rd Generation Partnership Project; Technical Specification Group Services and System Aspects; System architecture for the 5G System (SGS); Stage 2 (Release 15), Dec. 2019, pp. 1-248, 3GPP TS 23.501 V15.8.0, Technical Specification, Valbonne, France.

3rd Generation Partnership Project; Technical Specification Group Services and System Aspects; Study on enhancement of Ultra-Reliable Low-Latency Communication (URLLC) support in the 5G Core network (5GC) (Release 16), Feb. 2019, pp. 1-87, 3GPP TR 23.725 Draft V16.0.0$_+$, Technical Report, Valbonne, France.

Huawei, Notification control during handover, Feb. 25-Mar. 1, 2019, pp. 1-2, 3GPP TSG-RAN WGS #103, R3-190892, Athens, Greece.

Huawei et al., TS23.501 : Clarification for the default QoS flow, notification control and 5QI, Aug. 21-25, 2017, pp. 13, SA WG2 Meeting #122Bis S2-175610.

Office Action issued on Chinese application 202110215380.0 on Jun. 29, 2023, 12 pages.

* cited by examiner

- HandoverRequest(S)
  - HandoverRequestIEs
    - AMF-UE-NGAP-ID(I)
    - HandoverType(E)
    - Cause(C)
    - UEAggregateMaximumBitRate(S)
    - CoreNetworkAssistanceInformationForInactive(S)
    - UESecurityCapabilities(S)
    - SecurityContext(S)
    - NewSecurityContextInd(E)
    - NAS-PDU(O)
    - PDUSessionResourceSetupListHOReq
      - PDUSessionResourceSetupItemHOReq(S)
        - PDUSessionID(I)
        - S-NSSAI(S)
        - PDUSessionResourceSetupRequestTransfer(S)
          - PDUSessionResourceSetupRequestTransferIEs
            - PDUSessionAggregateMaximumBitRate(S)
            - UPTransportLayerInformation(C)
            - UPTransportLayerInformationList
            - DateForwardingNotPossible(E)
            - PDUSessionType(E)
            - SecurityIndication(S)
            - NetworkInstance(I)
            - QosFlowSetupRequestList
              - QosFlowSetupRequestItem(S)
                - QosFlowIdentifier(I)
                - QosFlowLevelQosParameters(S)
                  - QosCharacteristics(C)
                  - AllocationAndRetentionPriority(S)
                  - GBR-QosInformation(S)
                  - ReflectiveQosAttribute(E)
                  - AdditionalQosFlowInformation(E)
                  - QosFlowLevelQosParameters-ExtIEs
                - E-RAB-ID(I)
                - QosFlowSetupRequestItem-ExtIEs
        - CommonNetworkInstance(O)
        - DirectForwardingPathAvailability(E)
        - UPTransportLayerInformation(C)
        - UPTransportLayerInformationList
        - CommonNetworkInstance(O)
        - RedundantPDUSessionInformation(S)
      - PDUSessionResourceSetupItemHOReq-ExtIEs

FIG. 28

US 12,309,646 B2

HANDOVER PROCESS-BASED MESSAGE TRANSMITTING METHOD AND APPARATUS, DEVICE, AND MEDIUM

RELATED APPLICATION

This application is a continuation of PCT Application PCT/CN2022/071026 filed Jan. 10, 2022, which claims priority to Chinese Patent Application No. 202110215380.0, entitled "HANDOVER PROCESS-BASED MESSAGE TRANSMITTING METHOD AND APPARATUS, DEVICE, AND MEDIUM" filed on Feb. 25, 2021, which is incorporated herein by reference in its entirety.

TECHNICAL FIELD

The present subject matter relates to the field of mobile communication, and specifically to a handover process-based message transmitting method and apparatus, a device, and a non-transitory computer-readable storage medium.

BACKGROUND OF THE DISCLOSURE

In 5th-generation (5G) mobile communication technologies, quality of service (QOS) control is implemented in units of QoS flows.

A QoS flow may either be guaranteed bit rate (GBR) or non-GBR depending on a bearer types. For a GBR QoS flow, the corresponding bit rate can be guaranteed even under the condition of network resource shortage; while for a non-GBR QoS flow, it needs to bear the requirement of reducing the rate under the condition of network resource shortage.

Nowadays, more than 90% of service traffic may be non-GBR QoS flows, such as audio and video calls, online conferencing, etc. There usually exists audio and video communication lag caused by a change in a radio network status.

SUMMARY

The present subject matter provides a handover process-based message transmitting method and apparatus, a device, and a non-transitory computer-readable storage medium, which can optimize a QoS notification mechanism for a non-GBR bearer flow. The technical solutions are as follows.

According to an aspect, the present subject matter provides a handover process-based message transmitting method, including:
  transmitting, by a source access network device, a control parameter of QoS notification control (QNC) of a non-GBR bearer flow to a target access network device during a handover process, so that the target access network device transmits a notification message to an application entity via a core network entity, in a case that a change in a parameter value of the QNC of the non-GBR bearer flow after the handover meets a reporting condition;
  the control parameter of the QNC indicates a parameter of the QNC of the non-GBR bearer flow and the reporting condition.

According to another aspect, the present subject matter provides a handover process-based message transmitting method, including:
  receiving, by a target access network device, a control parameter of QNC during a handover process, the control parameter of the QNC indicates a parameter of the QNC of a non-GBR bearer flow and a reporting condition; and
  after the handover is completed, transmitting, by the target access network device, a notification message to an application entity via a core network entity, in a case that a change in a parameter value of the QNC of the non-GBR bearer flow meets the reporting condition.
  the control parameter of the QNC indicates a parameter of the QNC of the non-GBR bearer flow and the reporting condition.

According to another aspect, the present subject matter provides a message transmitting apparatus during a handover process, including:
  a transmitting module, configured to transmit a control parameter of QNC of a non-GBR bearer flow to a target access network device during a handover process, so that the target access network device transmits a notification message to an application entity via a core network entity, in a case that a change in a parameter value of the QNC of the non-GBR bearer flow after the handover is completed meets a reporting condition;
  the control parameter of the QNC indicates a parameter of the QNC of the non-GBR bearer flow and the reporting condition.

According to another aspect, the present subject matter provides a message transmitting apparatus during a handover process, including:
  a receiving module, configured to receive a control parameter of QNC during a handover process, the control parameter of the QNC indicates a parameter of the QNC of a non-GBR bearer flow and a reporting condition; and
  a transmitting module, configured to, after the handover is completed, transmit a notification message to an application entity via a core network entity, in a case that a change in a parameter value of the QNC of the non-GBR bearer flow meets the reporting condition.

According to another aspect, the present subject matter provides an access network device, including: a processor and a memory, the memory storing a computer program, and the computer program being loaded and executed by the processor to implement the handover process-based message transmitting method described above.

According to another aspect of the present subject matter, a non-transitory computer-readable storage medium is provided, storing a computer program, the computer program being loaded and executed by a processor to implement the handover process-based message transmitting method described above.

According to another aspect of the present subject matter, a computer program product is provided, the computer program product including computer instructions, the computer instructions being stored in a non-transitory computer-readable storage medium. A processor of a computer device reads the computer instructions from the non-transitory computer-readable storage medium and executes the computer instructions to cause the computer device to perform the handover process-based message transmitting method provided in the foregoing aspect.

The technical solutions provided in the examples of the present subject matter achieve at least the following beneficial effects:
  Since the handover process is most easily to cause a quick change in a radio network status, the source access network device transmits the control parameter of the QNC of the non-GBR bearer flow to the target access network device, so that the target access network device can transmit the notification message to the application entity via the core network entity when the increase/decrease of the parameter of the QNC of the non-GBR bearer flow meets the reporting condition. As such, in the case that the relevant parameter of the non-GBR bearer flow becomes bad, or that the relevant parameter of the non-GBR bearer flow has gone from bad to good, the application entity can adjust its internal application program to adapt to the parameter change, thereby optimizing the running of the application program.

BRIEF DESCRIPTION OF THE DRAWINGS

FIG. 28 shows a diagram of a message structure of a handover request according to another example of the present subject matter.

DETAILED DESCRIPTION

Figure 1:
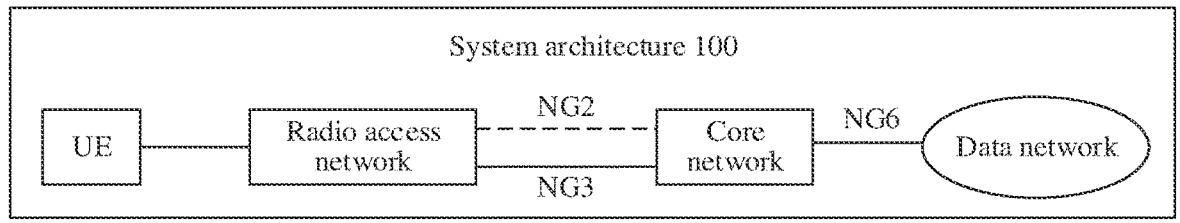
FIG. 1 shows a structural block diagram of a communication system according to an example of the present subject matter.

FIG. 1 shows a schematic architectural diagram of a communication system according to an example of the present subject matter. As shown in FIG. 1, a system architecture 100 may include: a user equipment (UE), a radio access network (RAN) device, a core network (Core) and a data network (DN). The UE, the RAN and the Core may be main components that constitute the architecture. Logically, they can be divided into a user plane and a control plane. The control plane is responsible for mobile network management, and the user plane is responsible for service data transmission. In FIG. 1, an NG2 reference point is located between the RAN control plane and the Core control plane, an NG3 reference point is located between the RAN user plane and the Core user plane, and an NG6 reference point is located between the Core user plane and the data network.

UE: an entrance for a mobile user to interact with a network. It can provide basic computing power and storage capacity, display service windows to users, and accept user inputs. The UE adopts the next generation air interface technology to establish signal connection and data connection with the RAN, so as to transmit control signals and service data to a mobile network.

RAN: It is deployed at a location close to the UE, similar to a base station in a conventional network. It provides a network access function for authorized users in a cell coverage region, and transmits user data using different qualities of transmission tunnels according to user levels, service requirements, etc. The RAN can manage its own resources and make reasonable use. It provides the access service for the UE on demand, and forwards control signals and user data between the UE and the Core.

Core: It is responsible for maintaining subscription data of the mobile network, managing network elements of the mobile network, and providing the UE with functions such as session management, mobility management, policy management, security authentication, etc. When the UE attaches, the Core provides network access authentication for the UE; when the UE has a service request, the Core allocates the network resource for the UE; when the UE moves, the Core updates the network resource for the UE; when the UE is idle, the Core provides a fast recovery mechanism for the UE. When the UE detaches, the Core releases the network resource for the UE; and when the UE has service data, the Core provides the UE with data routing function, such as, forwarding uplink data to the DN, or receiving UE downlink data from the DN, forwarding it to the RAN, so as to transmit it to the UE.

DN: It is a data network that provides data services to users. Generally, a client is located at the UE, and a server is located at the data network. The data network may be a private network, such as a local area network; or an external network that may not be controlled by an operator, such as the Internet; or a proprietary network jointly deployed by operators, such as for configuring IP multimedia core network subsystem (IMS) services.

Figure 2:
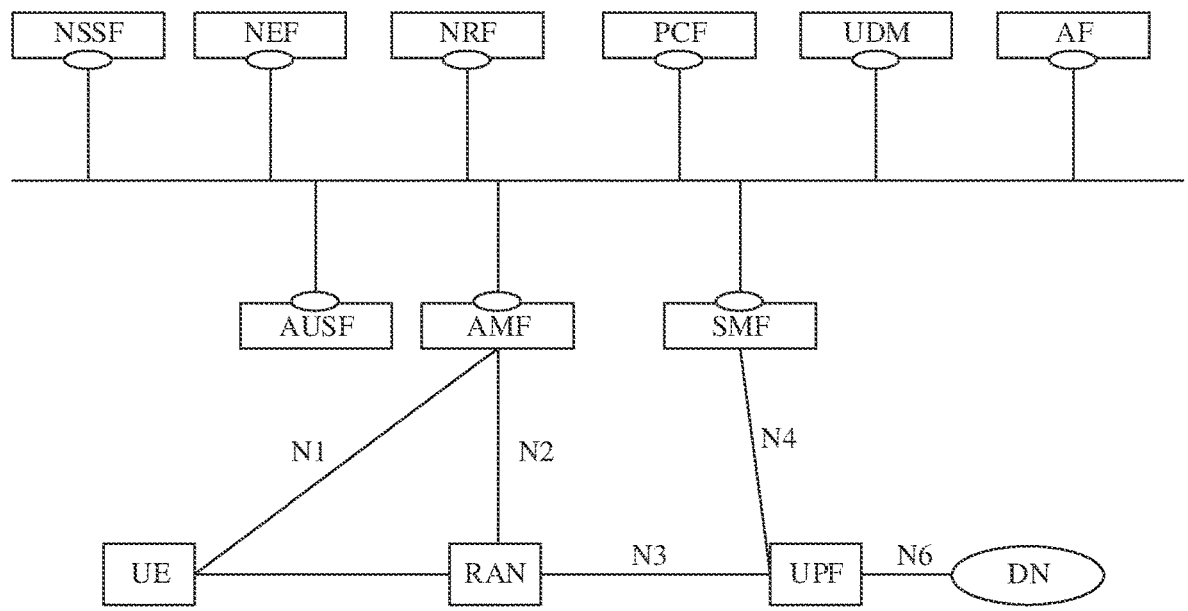
FIG. 2 shows a structural block diagram of a communication system according to another example of the present subject matter.

FIG. 2 is a detailed architecture determined on the basis of FIG. 1. The core network user plane includes a user plane function (UPF). The core network control plane includes an authentication server function (AUSF), an access and mobility management function (AMF), a session management function (SMF), a network slice selection function (NSSF), a network exposure function (NEF), a network function (NF) repository function (NRF), a unified data management (UDM) function, a policy control function (PCF), an application function (AF). These functional entities (called functions or entities for short) have the following functions:

UPF: It forwards user data packets according to a routing rule of the SMF.

AUSF: It performs security authentication of the UE.

AMF: It is responsible for UE access and mobility management.

SMF: It is responsible for UE session management.

NSSF: It selects network slices for the UE.

NEF: It opens network functions to a third party over API interfaces.

NRF: It provides a storage function and a selection function of network function entity information for other network elements.

UDM: It is responsible for user subscription context management.

PCF: It is responsible for user policy management.

AF: It is responsible for user application management.

In the architecture shown in FIG. 2, an N1 interface is a reference point between the UE and the AMF; an N2 interface is a reference point between the RAN and the AMF, and is configured to transmit NAS messages, etc.; an N3 interface is a reference point between the RAN and the UPF, and is configured to transmit user plane data, etc.; an N4 interface is a reference point between the SMF and the UPF, and is configured to transmit tunnel identification information and data cache indication information of the N3 connection, as well as downlink data notification messages, etc.; and an N6 interface is a reference point between the UPF and the DN, and is configured to transmit user plane data, etc. The NG interface is an interface between a radio access network device and a 5G core network.

The name of the interface between each network element shown in FIG. 1 and FIG. 2 is exemplary. These interfaces in specific implementations may use other names, which may not be limited herein. The name of each network element (such as SMF, AF, UPF, etc.) shown in FIG. 1 and FIG. 2 is also exemplary, which does not limit the function of the network element itself. In 5GS and other future networks, these network elements may use other names, which may not be specifically limited herein. For example, in a 6G network, some or all of these network elements may use the terminologies in 5G, or may use other names. The unified explanation is made here, and will not be repeatedly hereafter. Moreover, the name of the transmitted message (or signaling) between each network element is merely exemplary, which does not constitute any limitation on the function of the message itself. Each network element entity may be implemented as a computer device, or a virtual computer device running in a computer device.

In the examples of the present subject matter, a quick change QoS notification control (QCQNC) mechanism is defined for a non-GBR QoS flow. The QCQNC mechanism is one kind of QoS notification control (QNC), which may be called QNC for short. In the QCQNC mechanism provided by the examples of the present subject matter, in response to detecting that a quick change in at least one QoS parameter of a non-GBR QoS flow takes place, the access network device transmits a quick change notification to the SMF. The SMF transmits the quick change notification to the PCF, the AF, and the UE. After receiving the quick change notification, the AF and the UE adjust their internal application programs, to make the application programs adapt to the change, thereby preventing phenomena such as lag from influencing quality of experience (QoE).

The QoS flow is the finest QoS granularity in a PUD session. In a 5G system, a QoS flow identifier (QFI) is used for distinguishing between QoS flows. The QoS flow is controlled by the SMF, and can be pre-configured or established in a PDU session establishment procedure, or modified in a PDU session modification procedure.

In the examples of the present subject matter, the following QoS characteristics may be defined for a non-GBR QoS flow:

5G QoS identifier (5QI), allocation and retention priority (ARP), and reflective QoS attribute (RQA).

Only the following QoS characteristics may be defined corresponding to the 5QI of the non-GBR QoS flow:

Resource type;
Which is divided into: GBR, delay-critical GBR, or non-GBR.
Priority level;
Packet delay budget (PDB);
The PDB (budget) includes a packet delay of the core network.
Packet error rate (PER);
Among the four QoS characteristics, the first two parameters resource type and priority level may be used for defining the characteristic of the 5QI, and the latter two parameters PDB and PER may be used for defining the performance of the 5QI.

In the examples of the present subject matter, the profile of the QOS QNC is three parameters related to the non-GBR QoS flow (NGBF): PDB, PER and current bit rate (CBR). When the RAN detects that an increased or decreased change rate (or an increased or decreased change value) of any parameter value of the three parameters exceeds a specified threshold (since different parameters have different properties, the corresponding change rate or change value of each parameter is different), it transmits a notification message to the SMF, and notifies the change rate or the change value of all the parameters. The SMF transmits the notification message to the PCF, the PCF transmits the notification message to the AF, and an application program corresponding to the AF may be adjusted accordingly. In addition, the SMF transmits the notification message to the UE through the NAS message, and an application program corresponding to the AF may be adjusted accordingly, which realizes interaction between the network and the application, and optimizing service transmission. This solves the lag problem in a case of network congestion, and also the problem that when the network condition becomes good, the application program still uses a low transmission rate, which may not make full use of the network resource, thereby failing to improve the user experience.

In an example, there may be two definitions for the parameter change:

1. Change Value

When a parameter value changes from A to B. B-A may be defined as the change value. Assuming that the change value when the parameter value changes from A to B may be a first change value, and a change value when the parameter value changes from B to A may be a second change value, amplitudes of the first change value and the second change value may be the same (regardless of whether the change values may be positive or negative).

2. Change Rate

In a possible design, when the parameter value changes from A to B. (B-A)/A may be defined as a change value. Assuming that a change rate when the parameter value changes from A to B may be a first change rate (B-A)/A, and a change rate when the parameter value changes from B to A may be a second change rate (A-B)/B, magnitudes of the first change rate and the second change rate may be the same (regardless of whether the change values may be positive or negative).

That is, the amplitude of (B-A)/A may not be equal to the amplitude of (A-B)/B (assuming B>A>0). Therefore, in the above definition, after the parameter value A increases by 30% to the parameter value B, and then the parameter value B decreases by 30%, the result may not be back to the parameter value A.

In another possible design, in order to make a parameter value back to the same parameter value after increasing by 30% and then decreasing by 30%, the change rate may be uniformly defined as (larger value of the parameter values before and after the change-smaller value of the parameter values before and after the change)/smaller value, or (larger value of the parameter values before and after the change-smaller value of the parameter values before and after the change)/larger value, or (larger value of the parameter values before and after the change-smaller value of the parameter values before and after the change)/a fixed value. The larger value may be the one with the larger absolute value of the parameter values before and after the change, the smaller value may be the one with the smaller absolute value of the parameter values before and after the change, and the fixed value may be a value that may be determined in advance. In this way, when the parameter value A increases by 30% first and then decreases by 30%, the result may be back to the original parameter value A.

In an example, the following communication protocol may be provided:

QoS Profile

Whether a QoS flow may be of the GBR type or of the non-GBR type may be determined according to its QoS profile. The QoS profile of the QoS flow may be transmitted to the (R)AN, and includes the following QoS parameters (details of the QoS parameters may be defined in section 5.7.2 of the standards TS23.501).

For each QoS flow, the QoS profile includes the QoS parameters;
5QI; and
ARP;
Only for each non-GBR QoS flow, the QoS profile may further include the QoS parameters;
QCQNC;
RQA;
Only for each GBR QoS flow, the QoS profile may further include the QoS parameters;
Guaranteed flow bit rate (GFBR)-uplink and downlink, and
Maximum flow bit rate (MFBR)-uplink and downlink; and
Only for a GBR QoS flow, the QoS profile may further include one or more QoS parameters;
Notification control;
Maximum packet loss rate-uplink and downlink.

In an example, a QoS quick change notification control profile may be provided.

The QoS quick change notification control profile may be provided for a non-GBR QoS flow that enables the quick change notification control. If a corresponding policy and charging control (PCC) rule includes relevant information (as described in TS 23.503), the SMF provides the NG-RAN with the quick change notification control profile in addition to the QoS profile file. If the SMF provides the NG-RAN with the quick change notification control profile (if the corresponding PCC rule information has changed), the NG-RAN replaces a previously stored profile with it.

The quick change notification control profile represents a quick change in any of the QoS parameters PDB, PER and the detected CBR, which helps the application program to control an application program traffic according to the changed QoS parameter. The quick change notification control profile represents (PDB, PER, CBR) having a quick change (increase or decrease) in a short period of time (20%, 10%, 30%), and a new value after the change can be maintained continuously. That is, such quick change may not be caused by short and fast spikes due to sudden shock interference, etc.

The quick change notification control profile may be any change combination of PDB, PER and CBR. For example, the quick change notification control profile may set an increased (or decreased) PDR to 20%; or set an increased (or decreased) PDR and PER to 20%, an increased (or decreased) CBR to 10%; or set an increased (or decreased) CBR to 30%.

When the NG-RAN transmits the quick change notification that meets the QCQNC profile to the SMF, the current QoS parameters (PDB, PER) and the CBR may be to be included in the notification message.

The QNC mechanism of a non-GBR bearer flow includes the following procedures:
 QNC control during the handover process;
 A configuration procedure of the QNC;
 An optimization procedure of the QNC;
 A notification procedure of the QNC (for AF); and
 A notification procedure of a changed parameter value of the QNC (for UE).

The above procedures may be described below.

1. QNC Control During the Handover Process

The handover process may be the most common factor that causes a quick change in the parameter of the QNC. Therefore, it may be necessary to introduce the QNC mechanism for a non-GBR bearer flow during the handover process.

Figure 3:
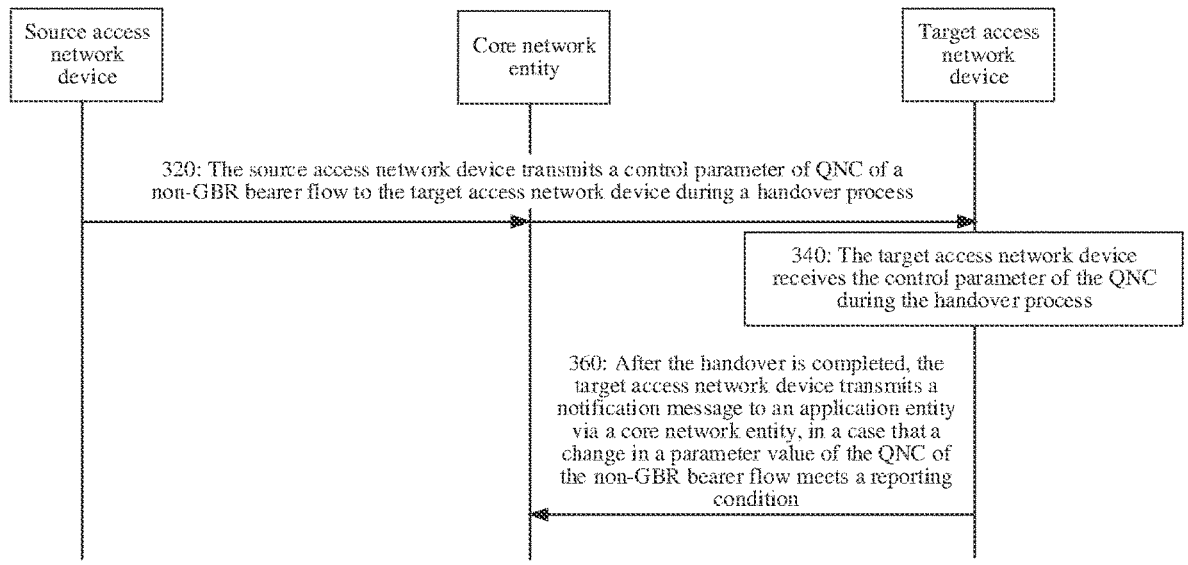
FIG. 3 shows a flowchart of a handover process-based message transmitting method according to an example of the present subject matter.

FIG. 3 is a flowchart of a handover process-based message transmitting method according to an example of the present subject matter. This example may be described by using an example in which the method may be applied to the communication system shown in FIG. 1 or FIG. 2. The method includes:

Step 320: A source access network device transmits a control parameter of QNC of a non-GBR bearer flow to a target access network device during a handover process.

The non-GBR bearer flow refers to a bearer flow of the non-GBR type. The non-GBR bearer flow includes: a non-GBR QoS flow or a non-GBR EPS bearer. Exemplarily, the non-GBR bearer flow may be a QoS flow of the non-GBR type in a 5G system; and the non-GBR bearer flow may be an EPS bearer of the non-GBR type in a 4G system.

The control parameter of the QNC may be used for indicating a parameter of the QNC of the non-GBR bearer flow and a reporting condition.

Exemplarily, the parameter of the QNC (or called QCQNC) includes at least one of the following: PDB, PER and CBR. In a case that the parameter of the QNC includes at least two parameters, the reporting conditions corresponding to the at least two parameters may be the same, and/or, the reporting conditions corresponding to the at least two parameters may be different.

Exemplarily, the reporting condition (or called a change threshold, a change reporting threshold) includes at least one of the following:

A change value of the parameter of the QNC in a first duration may be greater than a first threshold.

The first threshold may be a decimal greater than 0 and less than 1. For example, the first threshold may be 20%, 30% and 40%. The first duration may be a period or a length of time used for calculating the change value, such as 1 second or 2 seconds.

A change rate of the parameter of the QNC in a second duration may be greater than a second threshold.

The second threshold may be a decimal greater than 0 and less than 1. For example, the second threshold may be 20%, 30% and 40%. The second duration may be a period or a length of time used for calculating the change rate, such as 1 second, 2 seconds.

The change value of the parameter of the QNC in the first duration may be greater than the first threshold, and maintains for a third threshold.

The third threshold may be a threshold used for measuring a maintaining duration of the change value, such as 2 seconds.

The change rate of the parameter of the QNC in the second duration may be greater than the second threshold, and maintains for a fourth threshold.

The fourth threshold may be a threshold used for measuring a maintaining duration of the change rate, such as 2 seconds.

That is, the third threshold and the third threshold may be thresholds that may be used for measuring durations of maintenance.

Step 340: The target access network device receives the control parameter of the QNC during the handover process.

The target access network device enables or starts the QNC of the non-GBR bearer flow according to the control parameter of the QNC.

Step 360: After the handover may be completed, the target access network device transmits a notification message to an application entity via a core network entity, in a case that a change in a parameter value of the QNC of the non-GBR bearer flow meets the reporting condition.

The change in the parameter value of the QNC includes at least one of the following two situations:

1. A change from a first parameter value to a second parameter value.

The first parameter value may be a parameter value of the parameter of the QNC before the handover, namely a current parameter value of the source access network device. The second parameter value may be a parameter value of the parameter of the QNC after the handover, namely a current parameter value of the target access network device.

2. A change from the second parameter value to a third parameter value.

The second parameter value and the third parameter value may be both parameter values of the parameter of the QNC after the handover. An acquisition time of the third parameter value may be later than that of the second parameter value.

Exemplarily, the notification message further carries: a changed parameter value of the QNC, namely a current parameter value of the parameter of the QNC after the quick change in the parameter of the QNC takes place. The "current" may not be in an absolute sense, it may be a relative concept. For example, the current parameter value may be a parameter value when the reporting condition may be triggered, and may not be necessarily equal to a real-time parameter value after the notification message may be transmitted.

Exemplarily, the changed parameter value of the QNC may be represented by a quantized value of the changed parameter value of the QNC. For example, a value range of the QNC may be divided into 16 non-overlapping sub-intervals. Each of the 16 sub-intervals has a unique quantization value, which may be represented by four bits. In a case that the changed parameter value of the QNC belongs to an $i^{th}$ sub-interval, it may be represented by the quantization value corresponding to the $i^{th}$ sub-interval. The quantization value only needs 4 bits, which reduces transmission resource required for the notification message.

To sum up, since the handover process may be most easily to cause the quick change in the radio network status, in the method according to this example, the source access network device transmits the control parameter of the QNC of the non-GBR bearer flow to the target access network device, so that when the increase/decrease of the parameter value of the QNC of the non-GBR bearer flow meets the reporting condition, the target access network device can transmit the notification message to the application entity and the terminal via the core network entity. As such, in a case that the relevant parameter of the non-GBR bearer flow becomes bad, or that the relevant parameter of the non-GBR bearer flow has gone from bad to good, the application entity can adjust its internal application program to adapt to the parameter change, thereby optimizing the running of the application program and the terminal.

Exemplarily, during the handover process, the source access network device transmits the control parameter of the QNC of the non-GBR bearer flow to the target access network device via the core network entity. In different communication systems, there may be different types, quantities and divisions of core network entities. For example, in a 5G system, the core network entity includes: a first core network entity AMF and a second core network entity SMF. The procedure in which the source access network device transmits the control parameter of the QNC of the non-GBR bearer flow to the target access network device via the core network entity optionally includes the following steps:

1. The source access network device transmits a handover requirement to a source first core network entity AMF during the handover process. The handover requirement carries the control parameter of the QNC.

2. The source first core network entity AMF transmits a create UE context request (Namf_Communication_CreateUEContext) to a target first core network entity AMF. The create UE context request carries the control parameter of the QNC.

3. The target first core network entity AMF transmits an update session context request (Nsmf_PDUSession_UpdateSMContext) to a second core network entity SMF. The update session context request carries the control parameter of the QNC.

4. The second core network entity SMF transmits an update session context response (Nsmf_PDUSession_UpdateSMContext response) to the target first core network entity AMF. The update session context response carries the control parameter of the QNC.

5. The target first core network entity AMF transmits a handover request to the target access network device. The handover request carries the control parameter of the QNC.

The control parameter of the QNC may be carried in a source-to-target transparent container. The source-to-target transparent container may be a field that may be transparently transmitted in the handover requirement, the create UE context request, the update session context request, the update session context response, and the handover request.

Figure 4:
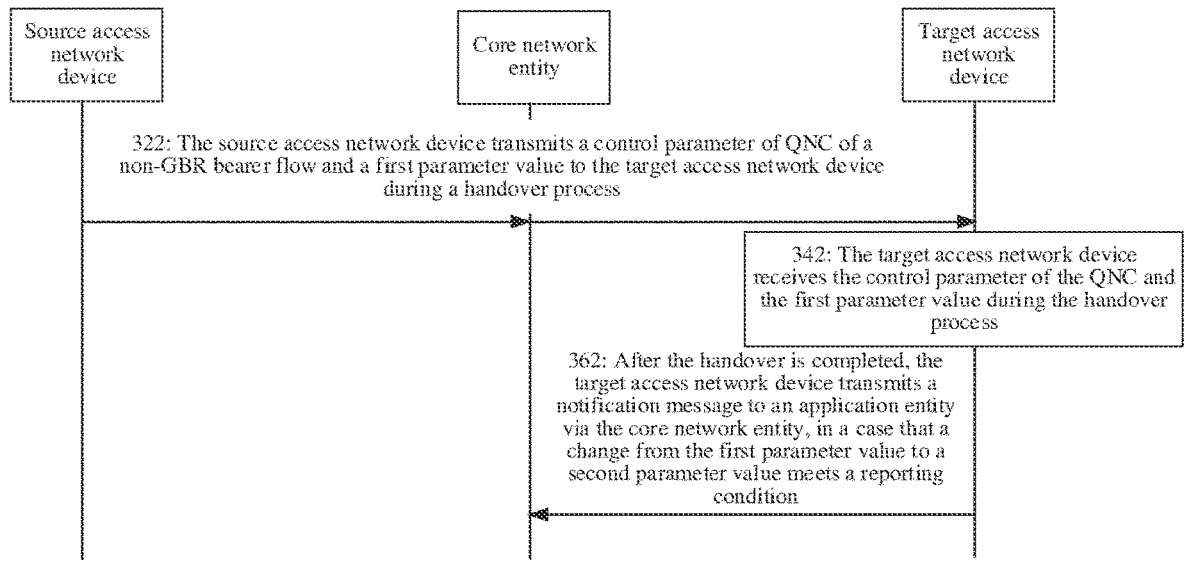
FIG. 4 shows a flowchart of a handover process-based message transmitting method according to another example of the present subject matter.

FIG. 4 is a flowchart of a handover process-based message transmitting method according to an example of the present subject matter. This example may be described by using an example in which the method may be applied to the communication system shown in FIG. 1 or FIG. 2. The method includes:

Step 322: A source access network device transmits a control parameter of QNC of a non-GBR bearer flow and a first parameter value to a target access network device during a handover process.

Compared with the example shown in FIG. 3, the source access network device transmits not only the control parameter of the QNC but also the first parameter value to the target access network device. The first parameter value may be a parameter value of the parameter of the QNC before the handover.

The control parameter of the QNC and the first parameter value may be transmitted in the same message, or in different messages. In the present subject matter, as an example, the control parameter of the QNC and the first parameter value may be transmitted in the same message.

Exemplarily, during the handover process, the source access network device transmits the control parameter of the QNC of the non-GBR bearer flow and the first parameter value to the target access network device via a core network entity. In different communication systems, there may be different types, quantities and divisions of core network entities. For example, in a 5G system, the core network entity includes: a first core network entity AMF and a second core network entity SMF. The procedure in which the source access network device transmits the control parameter of the QNC of the non-GBR bearer flow and the first parameter value to the target access network device via the core network entity optionally includes the following steps:

1. The source access network device transmits a handover requirement to a source first core network entity AMF during the handover process. The handover requirement carries the control parameter of the QNC.

2. The source first core network entity AMF transmits a create UE context request to a target first core network entity AMF. The create UE context request carries the control parameter of the QNC and the first parameter value.

3. The target first core network entity AMF transmits an update session context request to a second core network entity SMF. The update session context request carries the control parameter of the QNC and the first parameter value.

4. The second core network entity SMF transmits an update session context response to the target first core network entity AMF. The update session context response carries the control parameter of the QNC and the first parameter value.

5. The target first core network entity AMF transmits a handover request to the target access network device. The handover request carries the control parameter of the QNC and the first parameter value.

Optionally, the control parameter of the QNC and the first parameter value may be carried in a source-to-target transparent container. The source-to-target transparent container may be a field that may be transparently transmitted in the handover requirement, the create UE context request, the update session context request, the update session context response, and the handover request.

Step 342: The target access network device receives the control parameter of the QNC and the first parameter value during the handover process.

Exemplarily, in addition to the control parameter of the QNC transmitted by the source access network device to the target access network device, the handover request may further carry a control parameter of the QNC transmitted by the second core network entity SMF to the target access network device.

The two sets of control parameters of the QNC may be carried in different fields of the handover request. Exemplarily, the control parameter of the QNC transmitted by the source access network device to the target access network device may be carried in the source-to-target transparent container field of the handover request, and the control parameter of the QNC transmitted by the second core network entity SMF to the target access network device may be carried in a QoS establishment request field of the handover request.

Normally, the two sets of control parameters of the QNC may be consistent. However, in a case that the two sets of control parameters of the QNC may be inconsistent, the target access network device preferentially uses the control parameter of the QNC transmitted by the second core network entity SMF to the target access network device.

Step 362: After the handover may be completed, the target access network device transmits a notification message to an application entity via the core network entity, in a case that a change from the first parameter value to a second parameter value meets a reporting condition.

The first parameter value may be a parameter value of the parameter of the QNC before the handover, and the second parameter value may be a parameter value of the parameter of the QNC after the handover.

Exemplarily, the notification message further carries: a changed parameter value of the QNC, namely a current parameter value of the parameter of the QNC after the quick change in the parameter of the QNC takes place. The "current" may not be in an absolute sense, it may be a relative concept. For example, the current parameter value may be a parameter value when the reporting condition may be triggered, and may not be necessarily equal to a real-time parameter value after the notification message may be transmitted.

Exemplarily, the changed parameter value of the QNC may be represented by a quantized value of the changed parameter value of the QNC. For example, a value range of the QNC may be divided into 16 non-overlapping sub-intervals. Each of the 16 sub-intervals has a unique quantization value, which may be represented by four bits. In a case that the changed parameter value of the QNC belongs to an $i^{th}$ sub-interval, it may be represented by the quantization value corresponding to the $i^{th}$ sub-interval. The quantization value only needs 4 bits, which reduces transmission resource required for the notification message.

To sum up, in the method according to this example, the source access network device transmits the first parameter value of the non-GBR bearer flow to the target access network device, so that the target access network device monitors the increase/decrease of the parameter of the QNC of the non-GBR bearer flow before and after the handover, and when the increase/decrease of the parameter of the QNC of the non-GBR bearer flow meets the reporting condition, transmits the notification message to the application entity and the terminal via the core network entity. As such, in a case that the relevant parameter of the non-GBR bearer flow becomes bad, or that the relevant parameter of the non-GBR bearer flow has gone from bad to good, the application entity can adjust its internal application program to adapt to the parameter change, thereby optimizing the running of the application program and the terminal.

Figure 5:
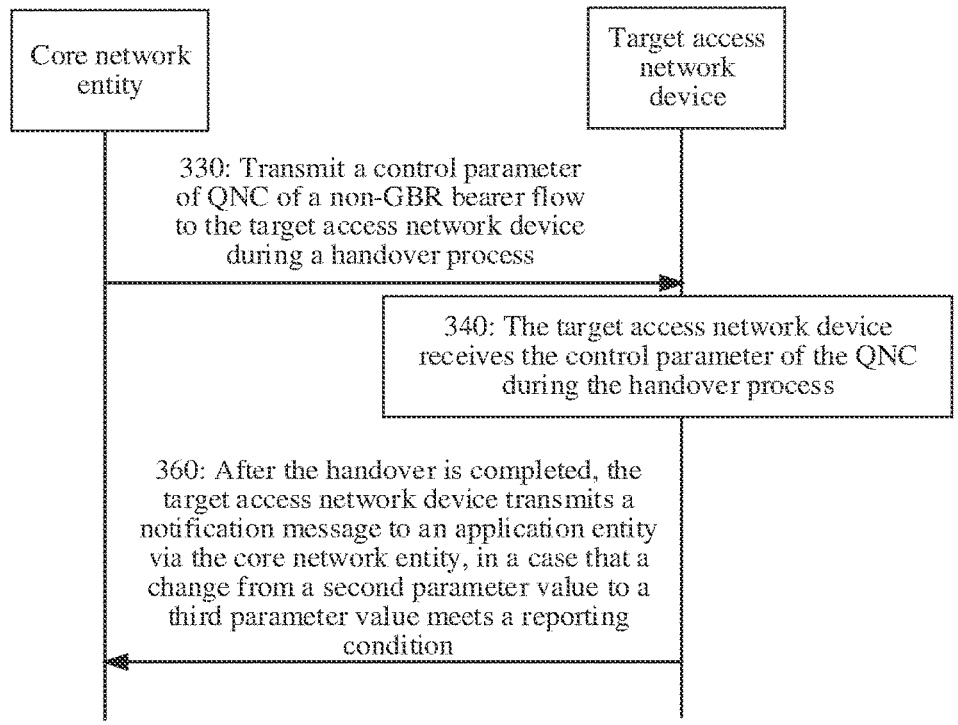
FIG. 5 shows a flowchart of a configuration method of QNC according to an example of the present subject matter.

In some cases, the source access network device or a certain access network device in the source access network device does not support the QNC of the non-GBR bearer flow, while the target access network device supports the QNC of the non-GBR bearer flow. The present subject matter further provides the following example, as shown in FIG. 5:

Step 330: A core network entity transmits a control parameter of QNC of a non-GBR bearer flow to a target access network device during a handover process.

After the core network entity receives a handover requirement from a source access network device, if the handover process involves handover of the non-GBR bearer flow, the core network entity may add a control parameter of the QNC into a handover request.

Exemplarily, a SMF adds the control parameter of the QNC into a QoS establishment request entry of the handover request. The control parameter of the QNC includes: whether to enable the QNC, a parameter of the QNC, and a reporting condition.

Step 340: The target access network device receives the control parameter of the QNC during the handover process.

The target access network device enables or starts the QNC of the non-GBR bearer flow according to the control parameter of the QNC.

Step 360: After the handover may be completed, the target access network device transmits a notification message to an application entity via the core network entity, in a case that a change from a second parameter value to a third parameter value meets the reporting condition.

The second parameter value and the third parameter value may be both parameter values of the parameter of the QNC after the handover. An acquisition time of the third parameter value may be later than that of the second parameter value.

To sum up, in the method according to this example, the core network entity transmits the control parameter of the QNC of the non-GBR bearer flow to the target access network device, so that in the case that the source access network device does not support the QNC of the non-GBR bearer flow, the target access network device can also be triggered to perform QNC control on the non-GBR bearer flow. Therefore, the QNC control of the non-GBR bearer flow can be introduced in the handover scenario which may be most easily to cause the quick change in the parameter of the QNC, to enhance the control over the application program, thereby making the application program better adapt to the network change.

2. Configuration Procedure of the QNC

In the procedure of establishing or modifying the non-GBR bearer flow, the core network entity performs the configuration procedure of the QNC for the (source) access network device. That is, the core network entity transmits a QNC profile to the (source) access network device. The QNC profile may be used for configuring the parameter of the QNC and the reporting condition (or called change threshold, quick change threshold, change reporting threshold, and quick change reporting threshold).

Figure 6:
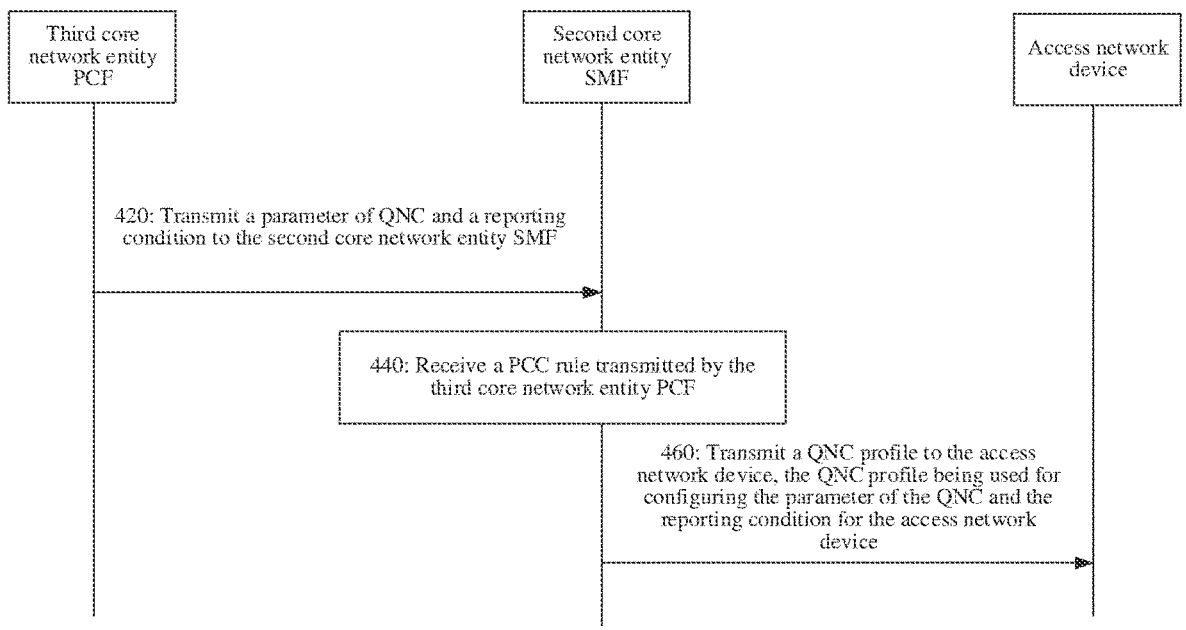
FIG. 6 shows a flowchart of a configuration method of QNC according to another example of the present subject matter.

FIG. 6 is a flowchart of a configuration method of QNC according to an example of the present subject matter. This example may be described by using an example in which the method may be applied to the communication system shown in FIG. 1 or FIG. 2. The method includes:

Step 420: A third core network entity PCF transmits a parameter of the QNC and a reporting condition to a second core network entity SMF.

The third core network entity may be an entity responsible for policy management in the core network.

The second core network entity may be an entity responsible for session management in the core network.

Exemplarily, in the procedure of establishing or modifying the non-GBR bearer flow, the third core network entity PCF transmits the parameter of the QNC and the reporting condition to the second core network entity SMF.

Exemplarily, in a PDU session establishment procedure, a (first) QoS flow may be established, which may be called a QoS Flow with a default QoS rule. Generally, this QoS flow may be of the non-GBR type. The third core network entity may provide the parameter of the QNC and the reporting condition to the second core network entity.

Exemplarily, the parameter of the QNC and the reporting condition may be determined by the third core network entity PCF itself. Alternatively, the parameter of the QNC and the reporting condition may be determined by the third core network entity PCF based on service flow information transmitted by an application entity. Alternatively, the parameter of the QNC and the reporting condition may be determined by the third core network entity PCF based on subscription data of a UE.

Step 440: The second core network entity SMF receives the PCC rule transmitted by the third core network entity PCF.

Step 460: The second core network entity transmits a QNC profile to an access network device. The QNC profile may be used for configuring the parameter of the QNC and the reporting condition for the access network device.

To sum up, in the method according to this example, the third core network entity transmits the parameter of the QNC and the reporting condition to the second core network entity, so that the second core network entity can be triggered to configure the parameter of the QNC and the reporting condition for the non-GBR bearer flow, thereby completing the configuration procedure of the QNC.

Figure 7:
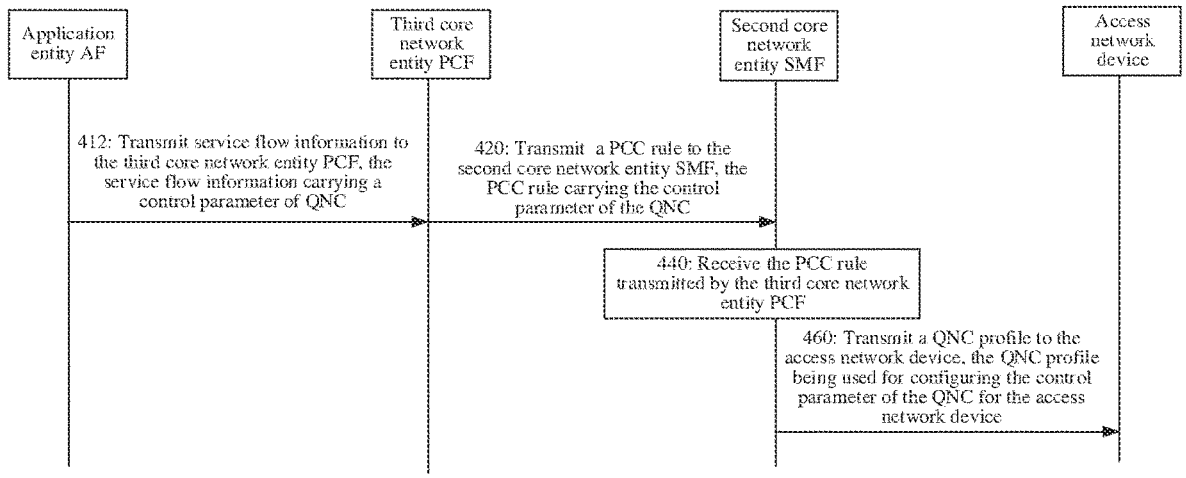
FIG. 7 shows a flowchart of a configuration method of QNC according to another example of the present subject matter.
Figure 8:
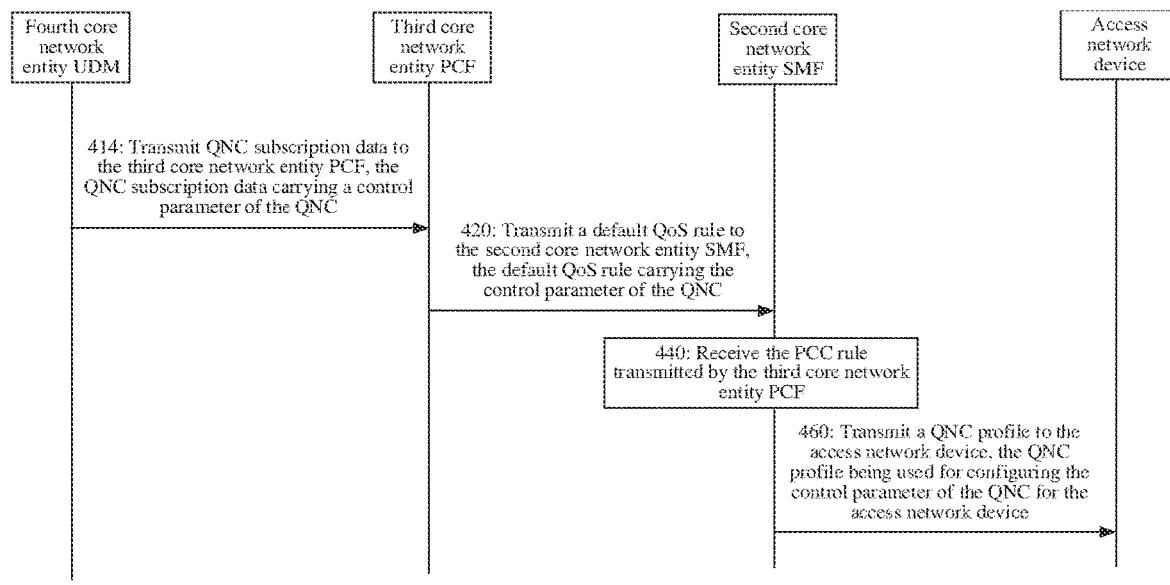
FIG. 8 shows a flowchart of an optimization method of QNC according to an example of the present subject matter.

In a design, the application entity provides the service flow information to the third core network entity. The service flow information carries the parameter of the QNC and the reporting condition required (or suggested) by the application entity, as shown in FIG. 7. In another design, the third core network entity determines the parameter of the QNC and the reporting condition based on QNC subscription data, as shown in FIG. 8.

FIG. 7 is a flowchart of a configuration method of QNC according to another example of the present subject matter. This example may be described by using an example in which the method may be applied to the communication system shown in FIG. 1 or FIG. 2. The method includes:

Step 412: An application entity AF transmits service flow information to a third core network entity PCF. The service flow information carries a control parameter of the QNC.

The control parameter of the QNC includes: at least one of whether to enable the QNC, a parameter of the QNC, and a change threshold.

Step 420: The third core network entity PCF transmits a PCC rule to a second core network entity SMF. The PCC rule carries the control parameter of the QNC.

Step 440: The second core network entity SMF receives the PCC rule transmitted by the third core network entity PCF.

Step 460: The second core network entity transmits a QNC profile to an access network device. The QNC profile may be used for configuring the control parameter of the QNC for the access network device.

To sum up, in the method according to this example, the application entity provides the control parameter of the QNC to the third core network entity, which can realize active interaction between the application entity and the core network entity. The application entity drives the radio access network device (such as 5G or 4G RAN) to report the quick change of the non-GBR bearer flow, so that the radio access network device opens its network capability to the application entity, thereby providing a new way for innovation of Internet applications.

FIG. 8 is a flowchart of a configuration method of QNC according to another example of the present subject matter. This example may be described by using an example in which the method may be applied to the communication system shown in FIG. 1 or FIG. 2. The method includes:

Step 414: A fourth core network entity UDM transmits QNC subscription data to a third core network entity PCF. The QNC subscription data carries a control parameter of the QNC.

If the default 5QI may be the NGBR type, the QNC subscription data may be added. The fourth core network entity UDM transmits the QNC subscription data to a second core network entity SMF, and the second core network entity SMF transmits the QNC subscription data to the third core network entity PCF.

Step 420: The third core network entity PCF transmits a default QoS rule to the second core network entity SMF. The default QoS rule carries the control parameter of the QNC.

Step 440: The second core network entity SMF receives the PCC rule transmitted by the third core network entity PCF.

Step 460: The second core network entity transmits a QNC profile to an access network device. The QNC profile may be used for configuring the control parameter of the QNC for the access network device.

To sum up, in the method according to this example, the third core network entity determines the control parameter of the QNC based on the subscription data of a UE, so that the 5G network can be driven to report the quick change of the non-GBR bearer flow to the AF and/or the UE based on the subscription data of the UE.

3. Optimization Procedure of the QNC

When the third core network entity PCF or the application entity AF finds that the notification message of the QNC may be too frequent, causing a large amount of signaling to the system, the third core network entity PCF or the application entity AF may be to modify the reporting condition of the QNC, such as increasing the change threshold.

Figure 9:
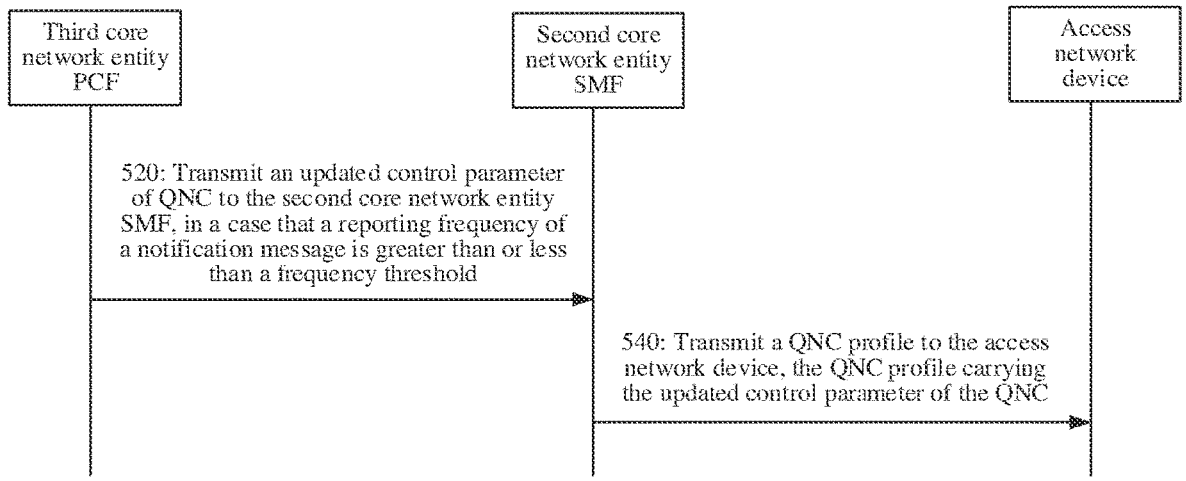
FIG. 9 shows a flowchart of an optimization method of QNC according to another example of the present subject matter.

FIG. 9 is a flowchart of an optimization method of QNC according to an example of the present subject matter. This example may be described by using an example in which the method may be applied to the communication system shown in FIG. 1 or FIG. 2. The method includes:

Step 520: A third core network entity PCF transmits an updated control parameter of the QNC to a second core network entity SMF, in a case that a reporting frequency of a notification message may be greater than or less than a frequency threshold.

The updated control parameter of the QNC includes: at least one of whether to enable the QNC, an updated parameter of the QNC, and an updated change threshold. That is, the updated control parameter of the QNC may update at least one of whether to enable the QNC, the parameter of the QNC, and the change threshold.

For example, when the reporting frequency of the notification message may be greater than the frequency threshold, the third core network entity PCF transmits an instruction of disabling the QNC to the second core network entity SMF. For another example, when the reporting frequency of the notification message may be greater than the frequency threshold, the third core network entity PCF transmits a decreased parameter of the QNC to the second core network entity SMF. For still another example, when the reporting frequency of the notification message may be greater than the frequency threshold, the third core network entity PCF transmits an increased change threshold to the second core network entity SMF.

Step 540: The second core network entity SMF transmits a QNC profile to a (target) access network device. The QNC profile carries the updated control parameter of the QNC.

To sum up, in the method according to this example, when the reporting frequency of the notification message may be greater than or less than the frequency threshold, the updated control parameter of the QNC may be transmitted to the second core network entity SMF and the access network device, which can avoid a large signaling overhead to the system, or can properly utilize the notification mechanism of the QNC.

Figure 10:
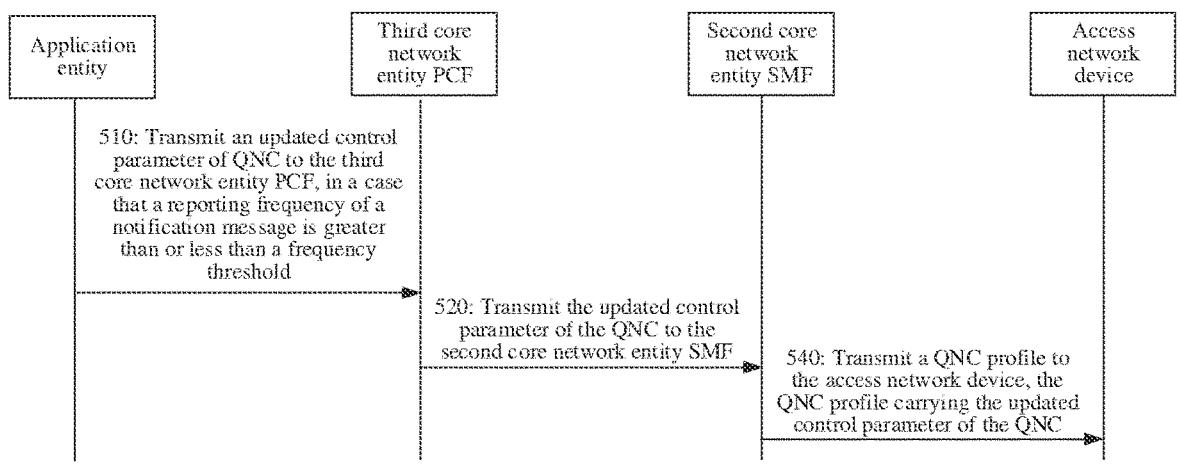
FIG. 10 shows a flowchart of a notification method of a parameter value of QNC according to an example of the present subject matter.

FIG. 10 is a flowchart of an optimization method of QNC according to another example of the present subject matter. This example may be described by using an example in which the method may be applied to the communication system shown in FIG. 1 or FIG. 2. The method includes:

Step 510: An application entity transmits an updated control parameter of the QNC to a third core network entity PCF, in a case that a reporting frequency of a notification message may be greater than or less than a frequency threshold.

The updated control parameter of the QNC includes: at least one of whether to enable the QNC, an updated parameter of the QNC, and an updated change threshold. That is, the updated control parameter of the QNC may update at least one of whether to enable the QNC, the parameter of the QNC, and the change threshold.

For example, when the reporting frequency of the notification message may be greater than the frequency threshold, the AF transmits an instruction of disabling the QNC to the third core network entity PCF. For another example, when the reporting frequency of the notification message may be greater than the frequency threshold, the AF transmits a decreased parameter of the QNC to the third core network entity PCF. For still another example, when the reporting frequency of the notification message may be greater than the frequency threshold, the AF transmits an increased change threshold to the third core network entity PCF.

Step 520: The third core network entity PCF transmits the updated control parameter of the QNC to a second core network entity SMF.

Step 540: The second core network entity SMF transmits a QNC profile to an access network device. The QNC profile carries the updated control parameter of the QNC.

To sum up, in the method according to this example, when the reporting frequency of the notification message may be greater than or less than the frequency threshold, the AF triggers the PCF to transmit the updated control parameter of the QNC to the second core network entity SMF and the access network device, which can avoid a large signaling overhead to the system, or can properly utilize the notification mechanism of the QNC.

4. Notification Procedure of the QNC (for AF)

Figure 11:
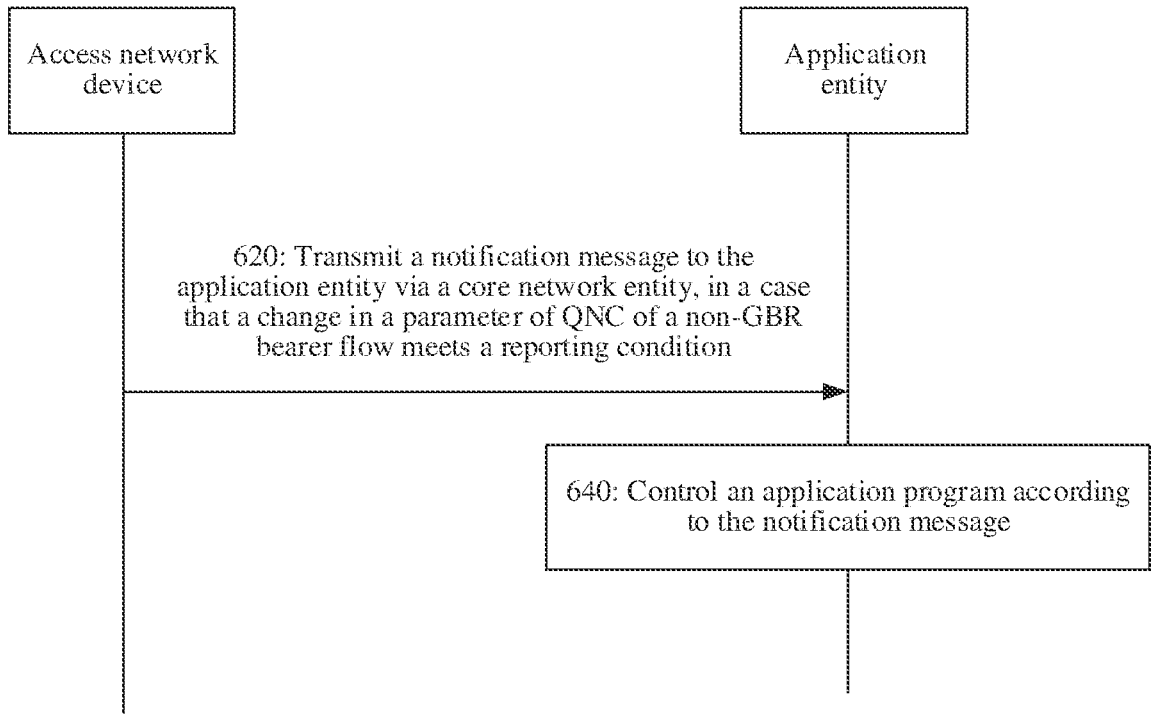
FIG. 11 shows a flowchart of a handover process-based message transmitting method during a handover process according to an example of the present subject matter.

FIG. 11 is a flowchart of a handover process-based message transmitting method according to an example of the present subject matter. This example may be described by using an example in which the method may be applied to the communication system shown in FIG. 1 or FIG. 2. The method includes:

Step 620: A (target) access network device transmits a notification message to an application entity via a core network entity, in a case that a change in a parameter of QNC of a non-GBR bearer flow meets a reporting condition.

Exemplarily, the notification message further carries: a changed parameter value of the QNC, namely a current parameter value of the parameter of the QNC after the quick change in the parameter of the QNC takes place. The "current" may not be in an absolute sense, it may be a relative concept. For example, the current parameter value may be a parameter value when the reporting condition may be triggered, and may not be necessarily equal to a real-time parameter value after the notification message may be transmitted.

There may be one or more core network entities. In a case that the notification message involves a plurality of core network entities located between a RAN and an AF, the plurality of core network entities transmits the notification message in turn. The different core network entities may use different types of messages to carry the notification message. For example, the core network entities include: a mobility management entity (MME), a serving gateway (SGW), a packet data network (PDN) gateway (PGW), and a PCF, then a transmission path of the notification message at least includes RAN→MME→SGW/PGW→PCF→AF. For another example, the core network entities include: a first core network entity AMF, a second core network entity SMF, and a third core network entity PCF, then the transmission path of the notification message at least includes RAN→AMF→SMF→PCF→AF.

Exemplarily, the core network entity transmits an event reporting to the application entity. The event reporting carries the notification message.

Step 640: The application entity controls an application program according to the notification message.

The notification message (or called quick change notification, or quick change report, or notification report) may be used for indicating that the change in the parameter of the QoS notification control QNC of the non-GBR bearer flow meets the reporting condition.

The application entity controls at least one of a calculation policy and a traffic policy of the application program according to the notification message, so as to make the application program adapt to the quick change in the relevant parameter of the non-GBR bearer flow.

A first possible implementation:

controlling the application program to perform according to a first calculation policy, in response to the notification message indicating that the parameter value of the QNC deteriorates; and controlling the application program to perform according to a second calculation policy, in response to the notification message used for indicating that the parameter value of the QNC becomes good.

The same calculation task has a shorter calculation time under the first calculation policy than under the second calculation policy.

The calculation policy may be a policy related to running calculation of the application program. The calculation policy includes but may not be limited to: at least one of a selection policy of codec mode, a selection policy of codec model, a selection policy of codec level, a selection policy of compression level, and a selection policy of neural network model.

As an example, the calculation policy includes the selection of codec mode. In response to the notification message indicating that the parameter value of the QNC deteriorates, the application program may be controlled to perform codec processing in a first codec mode; and in response to the notification message indicating that the parameter value of the QNC becomes good, the application program may be controlled to perform codec processing in a second codec mode. The "codec" herein refers to at least one of encoding and decoding.

The same codec task has a shorter calculation time under the first codec policy than under the second codec policy.

For example, when the PDB increases, although the network latency becomes high, the application program compensates the degradation of the network latency by reducing the internal calculation time, thereby still ensuring that the overall transmission delay remains unchanged or changes little.

A second possible implementation:
controlling the application program to perform according to a first traffic policy, in response to the notification message indicating that the parameter value of the QNC deteriorates; and
controlling the application program to perform according to a second traffic policy, in response to the parameter that the notification message indicates that the parameter value of the QNC becomes good.

A traffic under the first traffic policy may be less than a traffic under the second traffic policy.

Exemplary, a traffic of the application program includes a voice data packet and a video data packet.

In response to the notification message indicating that the parameter value of the QNC deteriorates, a first traffic corresponding to the voice data packet may be maintained, and a second traffic corresponding to the video data packet may be reduced. In response to the notification message indicating that the parameter value of the QNC becomes good, the first traffic corresponding to the voice data packet may be maintained, and the second traffic corresponding to the video data packet may be increased.

In cloud-based applications (video conferencing, voice conferencing, distance learning), two-way interaction of video and audio may be usually required, which has a certain requirement for the network transmission delay (normally unidirectional transmission delay<150 ms). However, in an actual use process, due to the change in the radio network status, the situation in which the transmission delay of the radio network suddenly deteriorates or the transmission rate suddenly decreases within a period of time (such as a 5 second time) results in audio and video lag.

Relevant research shows that users may be very sensitive to audio lag, but not too sensitive (also, it may be acceptable to temporarily turn off the video while preserving audio) to changes in video quality (such as changes in resolution and clarity). There may be less lag for audio thanks to its small amount of data transmission. But user experience may be poor when there may be audio lag. In addition, even if the audio quality may be reduced from CD quality to a very low transmission rate (such as 2G voice transmission quality), as long as there may be no lag, users still have good experience.

To sum up, in the method according to this example, the application entity adjusts the application program according to the changed parameter value of the QNC, so that in the case that the relevant parameter of the non-GBR bearer flow deteriorates, or that the relevant parameter of the non-GBR bearer flow has gone from bad to good, the application entity can adjust its internal application program to adapt to the parameter change, thereby optimizing the running of the application program.

The method according to this example changes the calculation policy of the application program, in the case that the relevant parameter of the non-GBR bearer flow becomes bad. By reducing the calculation time within the application program, the degradation due to network latency may be compensated, thereby still ensuring that the overall transmission delay remains unchanged or changes very little.

The method according to this example changes the traffic policy of the application program, such as maintaining the traffic of the voice data packet, reducing the traffic of the video data packet, in the case that the relevant parameter of the non-GBR bearer flow becomes bad. This can avoid occurrence of audio lag from causing a greater impact on user experience, thereby improving user experience when a user uses an audio and video program.

5. Notification Procedure of a Parameter Value of the QNC (for UE)

Figure 12:
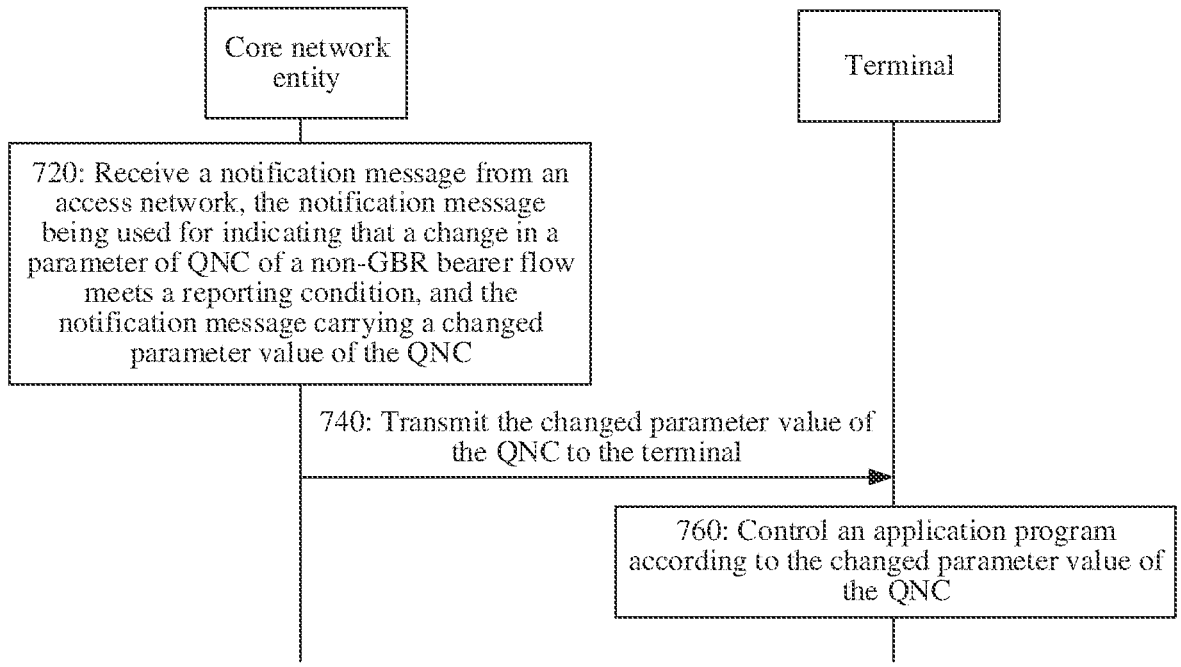
FIG. 12 shows a flowchart of a handover process-based message transmitting method during a handover process according to another example of the present subject matter.

FIG. 12 is a flowchart of a notification method of a parameter value of QNC according to an example of the present subject matter. This example may be described by using an example in which the method may be applied to the communication system shown in FIG. 1 or FIG. 2. The method includes:

Step 720: A core network entity receives a notification message from an access network device. The notification message may be used for indicating that a change in a parameter of QNC of a non-GBR bearer flow meets a reporting condition, and the notification message carries a changed parameter value of the QNC.

Step 740: The core network entity transmits the changed parameter value of the QNC to a terminal.

For example, the core network entity may be a SMF. The SMF transmits the changed parameter value of the QNC to a UE after receiving the notification message from the access network device.

Exemplarily, in a case that the SMF fails to receive a new PCC rule transmitted from a PCF within a predetermined period of time after receiving the notification message, the SMF transmits the changed parameter value of the QNC to the terminal.

Exemplarily, in a case that the SMF receives a new PCC rule transmitted from the PCF within the predetermined period of time after receiving the notification message, and the new PCC rule has no modification to a QoS profile, the SMF transmits the changed parameter value of the QNC to the terminal.

The changed parameter value of the QCQNC may be transparently transmitted from the core network entity to the terminal via a RAN. Optionally, the core network entity transmits a NAS message to the UE, and the terminal receives the NAS message transmitted from the core network entity. The NAS message carries the changed parameter value of the QNC. Optionally, the core network entity transmits a PDU session modification command to the terminal, and the terminal receives the PDU session modification command transmitted from the core network entity. The PDU session modification command carries the changed parameter value of the QCQNC.

Step 760: The terminal controls an application program according to the changed parameter value of the QNC.

The UE controls at least one of the calculation policy and the traffic policy of the application program according to the changed parameter value of the QNC, to make the application program adapt to the quick change in the relevant parameter of the non-GBR bearer flow.

A first possible implementation:
controlling the application program to perform according to a first calculation policy, in response to that the changed parameter value of the QNC deteriorates; and
controlling the application program to perform according to a second calculation policy, in response to that the changed parameter value of the QNC becomes good.

The same calculation task has a shorter calculation time under the first calculation policy than under the second calculation policy.

The calculation policy may be a policy related to running calculation of the application program. The calculation policy includes but may not be limited to: at least one of a selection policy of codec mode, a selection policy of codec model, a selection policy of codec level, a selection policy of compression level, and a selection policy of neural network model.

As an example, the calculation policy includes the selection of codec mode. In response to that the changed parameter value of the QNC deteriorates, the application program may be controlled to perform codec processing in a first codec mode; and in response to that the changed parameter value of the QNC becomes good, the application program may be controlled to perform codec processing in a second codec mode. The "codec" herein refers to at least one of encoding and decoding.

The same codec task has a shorter calculation time under the first codec policy than under the second codec policy.

For example, when the PDB increases, although the network latency becomes high, the application program compensates the degradation of the network latency by reducing the internal calculation time, thereby still ensuring that the overall transmission delay remains unchanged or changes little.

A second possible implementation:
controlling the application program to perform according to a first traffic policy, in response to that the changed parameter value of the QNC deteriorates; and
controlling the application program to perform according to a second traffic policy, in response to that the changed parameter value of the QNC becomes good.

A traffic under the first traffic policy may be less than a traffic under the second traffic policy.

Exemplary, a traffic of the application program includes a voice data packet and a video data packet.

In response to that the changed parameter value of the QNC deteriorates, a first traffic corresponding to the voice data packet may be maintained, and a second traffic corresponding to the video data packet may be reduced. In response to that the changed parameter value of the QNC becomes good, the first traffic corresponding to the voice data packet may be maintained, and the second traffic corresponding to the video data packet may be increased.

In cloud-based applications (video conferencing, voice conferencing, distance learning), two-way interaction of video and audio may be usually required, which has a certain requirement for the network transmission delay (normally unidirectional transmission delay<150 ms). However, in an actual use process, due to the change in the radio network status, the situation in which the transmission delay of the radio network suddenly deteriorates or the transmission rate suddenly decreases within a period of time (such as a 5 second time) results in audio and video lag.

Relevant research shows that users may be very sensitive to audio lag, but not too sensitive (also, it may be acceptable to temporarily turn off the video while preserving audio) to changes in video quality (such as changes in resolution and clarity). There may be less lag for audio thanks to its small amount of data transmission. But user experience may be poor when there may be audio lag. In addition, even if the audio quality may be reduced from CD quality to a very low transmission rate (such as 2G voice transmission quality), as long as there may be no lag, users still have good experience.

To sum up, in the method according to this example, the UE adjusts the application program according to the changed parameter value of the QNC, so that in the case that the relevant parameter of the non-GBR bearer flow deteriorates, or that the relevant parameter of the non-GBR bearer flow has gone from bad to good, the UE can adjust its internal application program to adapt to the parameter change, thereby optimizing the running of the application program.

The method according to this example changes the calculation policy of the application program, in the case that the relevant parameter of the non-GBR bearer flow becomes bad. By reducing the calculation time within the application program, the degradation due to network latency may be compensated, thereby still ensuring that the overall transmission delay remains unchanged or changes very little.

The method according to this example changes the traffic policy of the application program, such as maintaining the traffic of the voice data packet, reducing the traffic of the video data packet, in the case that the relevant parameter of the non-GBR bearer flow becomes bad. This can avoid occurrence of audio lag from causing a greater impact on user experience, thereby improving user experience when a user uses an audio and video program.

The above procedures may be detailed below in combination with the communication protocol (TS23.502) of the third generation partnership project (3GPP). Specific content about the network element name, step procedure and step introduction in the following drawings may refer to relevant content in TS23.502 (https://www.3gpp.org/ftp/Specs/archive/23_series/23.502), and this article may be limited by space, focusing on the different contents of the examples of the present subject matter and the TS23.502 protocol.

1. Notification Procedure of the QNC

When a network in which the UE may be located changes, namely a base station detecting that a quick change (becomes good or bad) of a radio resource, if this change reaches a change threshold defined by the QNC, the RAN triggers the notification procedure of the QNC, to transmit a notification message to the AF. Optionally, the notification message carries a changed parameter value (current parameter value) of the parameter of the QNC. The base station first transmits the notification message to the SMF, then the SMF transmits the notification message to the PCF, and then the PCF transmits the notification message to the AF.

1.1 Non-Roaming and Roaming with Local Breakout Scenario

Figure 13:
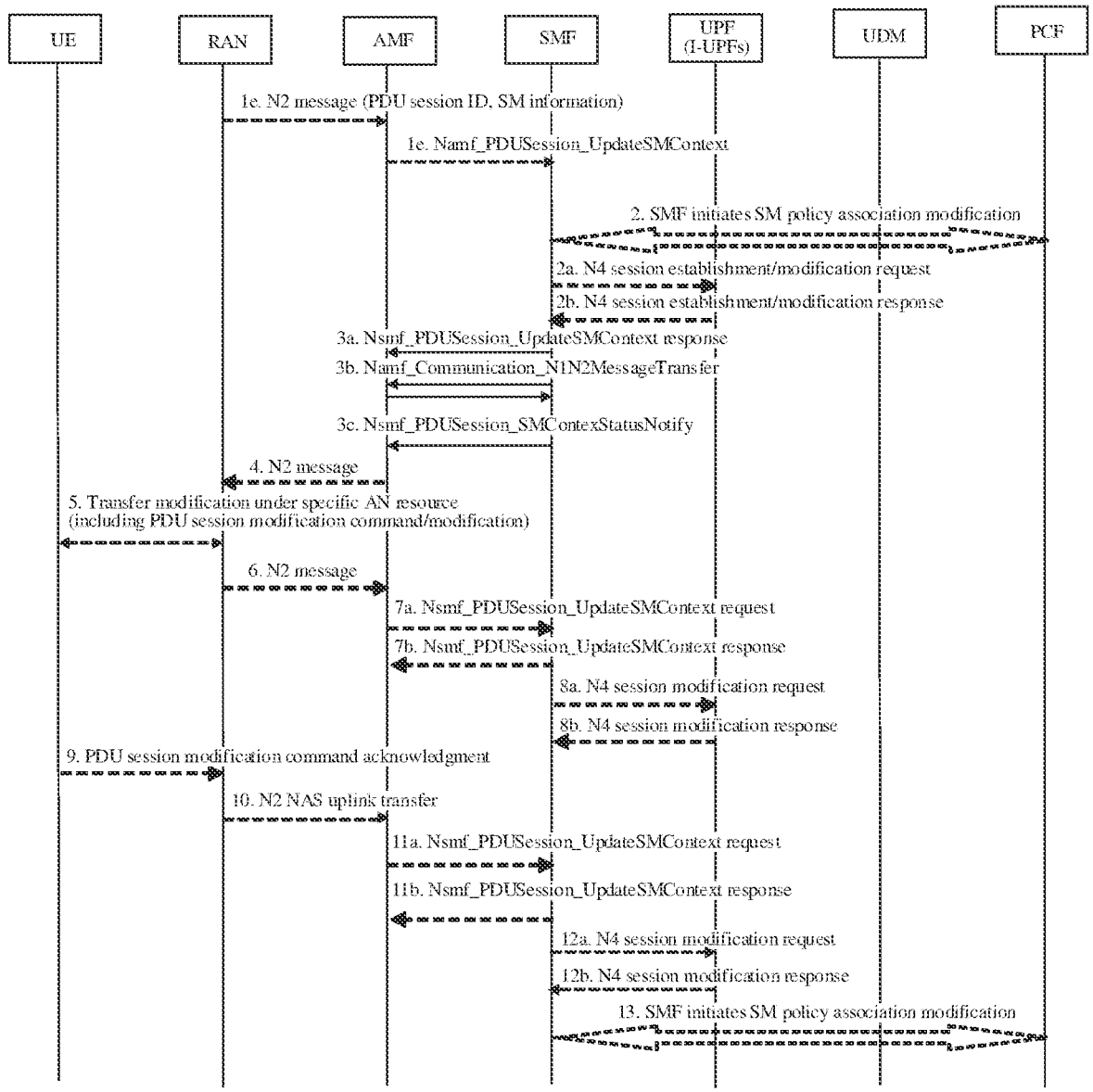
FIG. 13 shows a schematic diagram of a UE or network requested PDU session modification (for non-roaming and roaming with local breakout) procedure according to an example of the present subject matter

FIG. 13 shows a schematic diagram of a UE or network requested PDU session modification (for non-roaming and roaming with local breakout) procedure according to an example of the present subject matter.

In step 1e, the RAN transmits N2 message (PDU session ID, SM information) to the AMF, and the AMF transmits a Namf_PDUSession_UpdateSMContext message to the SMF.

When the parameter of the QNC of the non-GBR bearer flow meets a reporting condition, the two messages carry the notification message. Optionally, the notification message further carries the changed parameter value of the QNC.

In step 2, the SM initiates a SM policy association modification procedure, to transmit the notification message to the PCF and the AF.

In step 5, the SM transmits a PDU session modification command to the UE, to transmit the changed parameter value of the QNC to the UE.

Exemplarily, after the SM receives the notification message for a period of time, in a case that the SMF fails to receive new PCC Rules of the PCF or the PCC Rule in the received PCC Rules for the SDF corresponding to QNC has no modification to the QoS, the SMF initiates the PDU session modification command to the UE, to notify the UE of the current parameter value (PDB, PER, CBR) of the QCQNC of the QFI corresponding to the current QNC.

In step 9, the UE responds a PDU session modification acknowledgment.

The PDU session modification command and the PDU session modification acknowledgment may be transparently transmitted between the UE and the SMF via the RAN.

Figure 14:
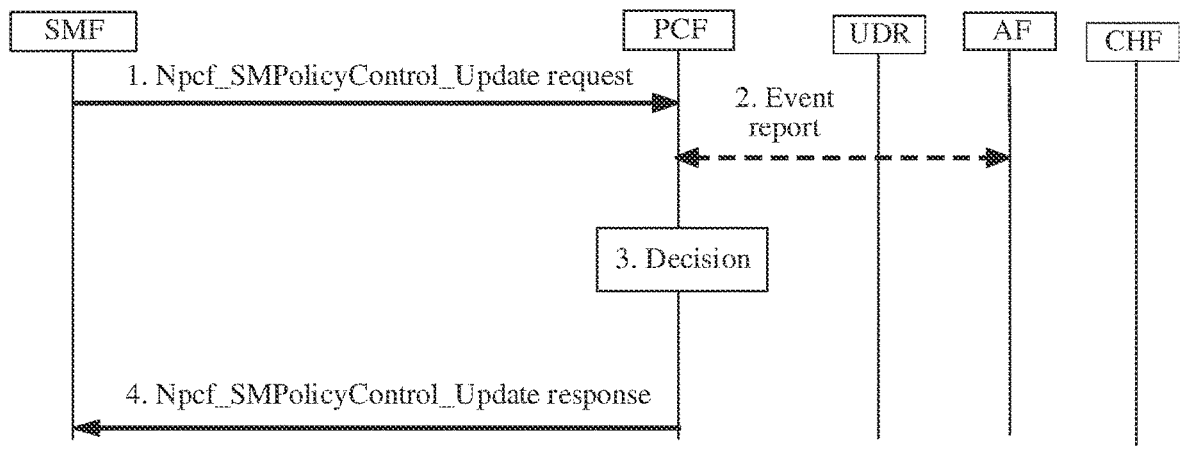
FIG. 14 shows a schematic diagram of a SM policy association modification procedure according to an example of the present subject matter.

The SM policy association modification procedure in step 2 may be defined by FIG. 14. As shown in FIG. 14:

In step 1, the SMF transmits an Npcf_SMPolicyControl_Update request to the PCF. The request carries the notification message.

In step 2, the PCF transmits an event report Npcf_PolicyAuthorizationNotify request to the AF. The event report carries the notification message.

1.2 Xn-Based Inter NG-RAN Handover Scenario

Figure 15:
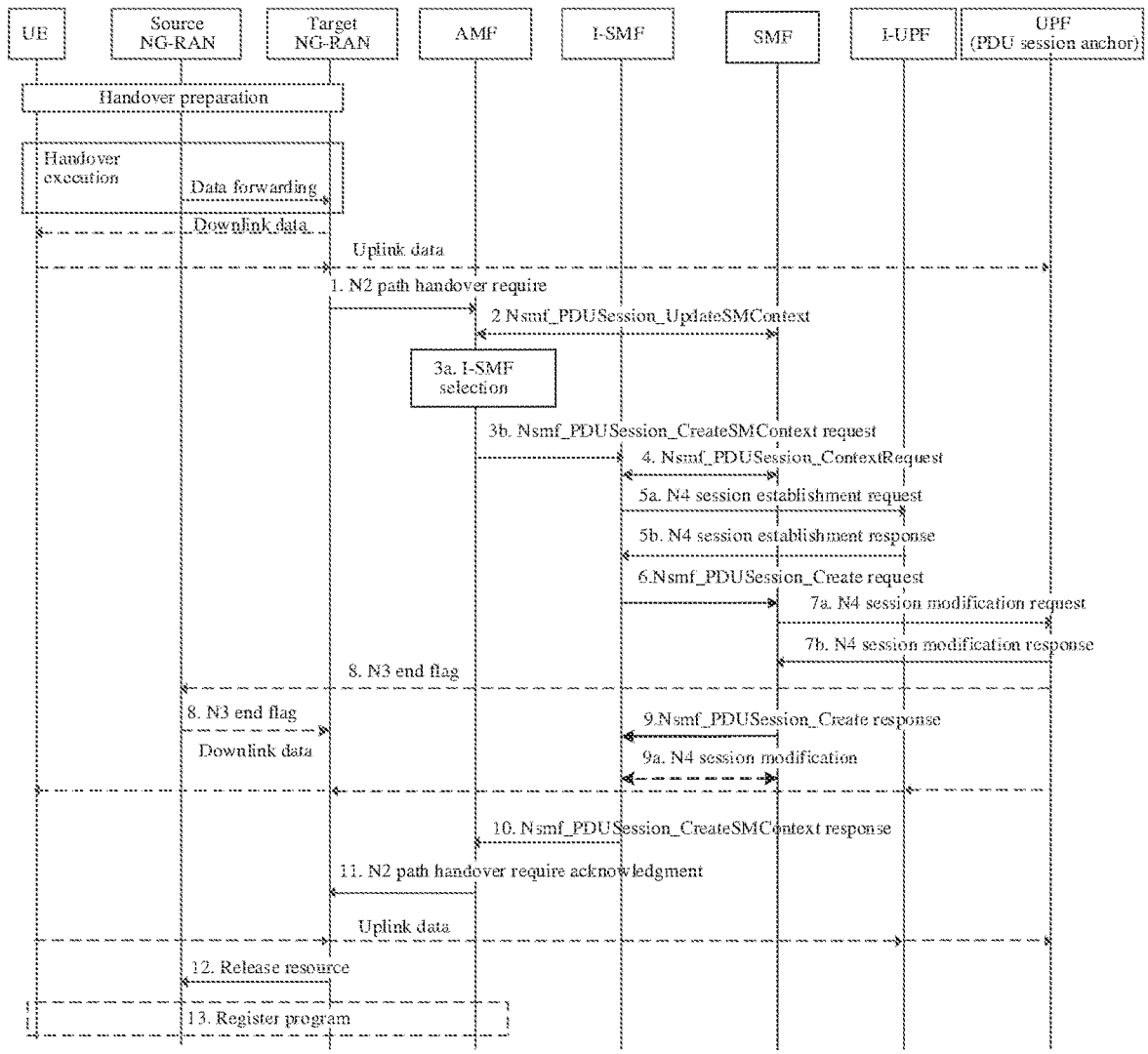
FIG. 15 shows a schematic diagram of a Xn-based inter NG-RAN handover process without UPF reallocation according to an example of the present subject matter.

FIG. 15 shows a schematic diagram of a Xn-based inter NG-RAN handover process without UPF reallocation according to an example of the present subject matter.

In the handover process, the source NG-RAN transmits to the target NG-RAN the control parameter of the QNC of the non-GBR bearer flow on the source side and the first parameter value of the QNC, namely the current parameter value of the parameter of the QNC before the handover.

In step 1, the target NG-RAN transmits an N2 path handover requirement to the AMF. The require carries a notification message, and the notification message optionally carries a parameter value (second parameter value) of the QNC after the handover.

Figure 16:
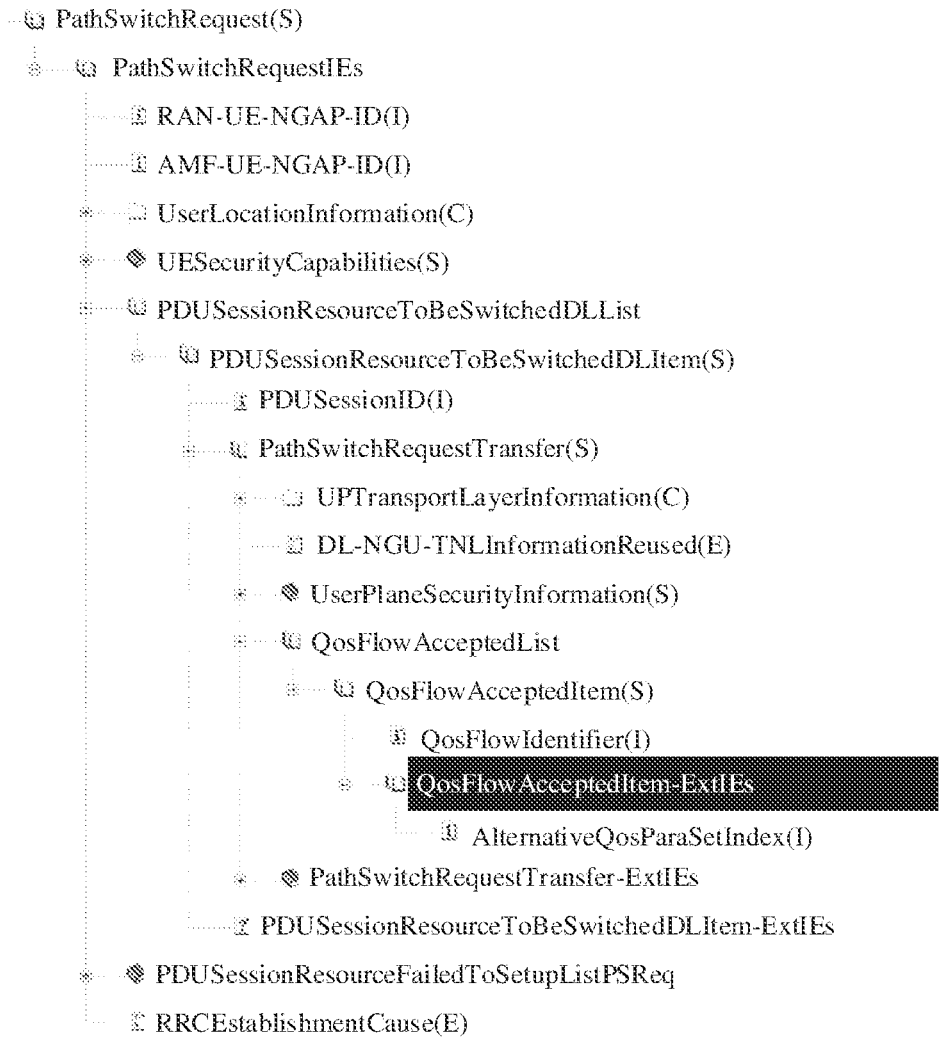
FIG. 16 shows a diagram of a message structure of an N2 path handover requirement according to an example of the present subject matter.

After the UE may be successfully handed over to the target NG-RAN, the resource status of the target NG-RAN may be inconsistent with that of the source NG-RAN, so the target NG-RAN determines whether to report the notification message. When the reporting may be needed, the parameter value of the QNC on the target NG-RAN after the handover may be included in a QoSFlow AcceptedItem field in the N2 path handover requirement. A message structure of the N2 path handover requirement may be shown in FIG. 16.

In step 2, the AMF transmits an Nsmf_PDUSession_UpdateSMContext request to the SMF. The request carries the notification message, and the notification message optionally carries the parameter value (second parameter value) of the QNC after the handover.

Then, the SMF reports the notification message to the PCF and the AF based on the procedures shown in FIG. 13 and FIG. 14.

1.3 NG-RAN Node N2 Based Handover Scenario

Figure 17:
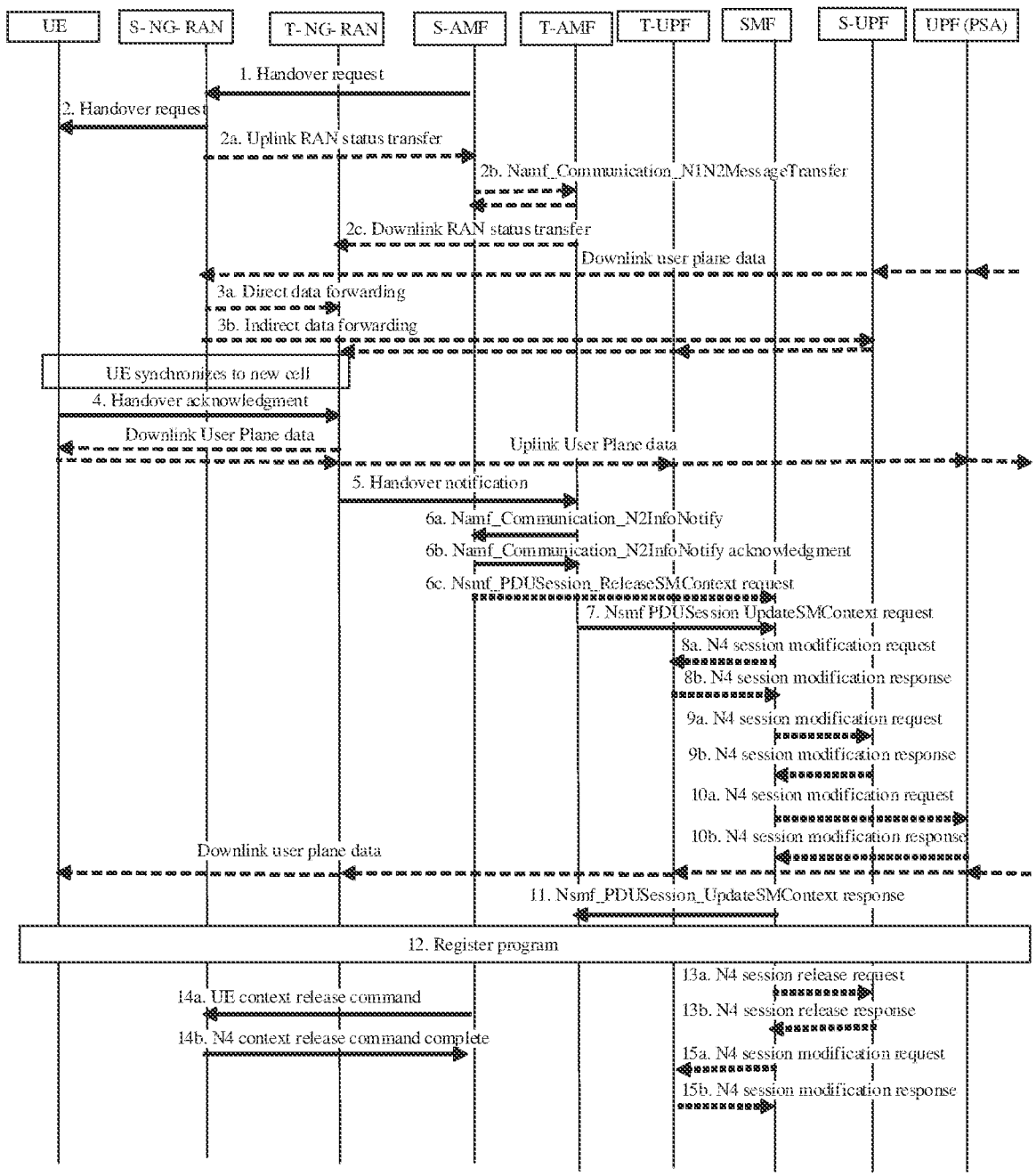
FIG. 17 shows a schematic diagram of an NG-RAN node N2 based handover process according to an example of the present subject matter.

FIG. 17 shows a schematic diagram of an NG-RAN node N2 based handover process according to an example of the present subject matter.

In step 5, the target NG-RAN transmits a handover notification to the target AMF. The handover notification carries a notification message, and the notification message optionally carries the parameter value (second parameter value) of the QNC on the target NG-RAN after the handover.

After the UE may be successfully handed over to the target NG-RAN, the resource status of the target NG-RAN may be inconsistent with that of the source NG-RAN, so the target NG-RAN determines whether to report the notification message. When the reporting may be needed, the notification message may be carried in the handover notification.

In step 7, the AMF transmits an Nsmf_PDUSession_UpdateSMContext request to the SMF. This request carries the notification message, and the notification message optionally carries the parameter value (second parameter value) of the QNC after the handover.

Then, the SMF reports the notification message to the PCF and the AF based on the procedures shown in FIG. 13 and FIG. 14.

Figure 18:
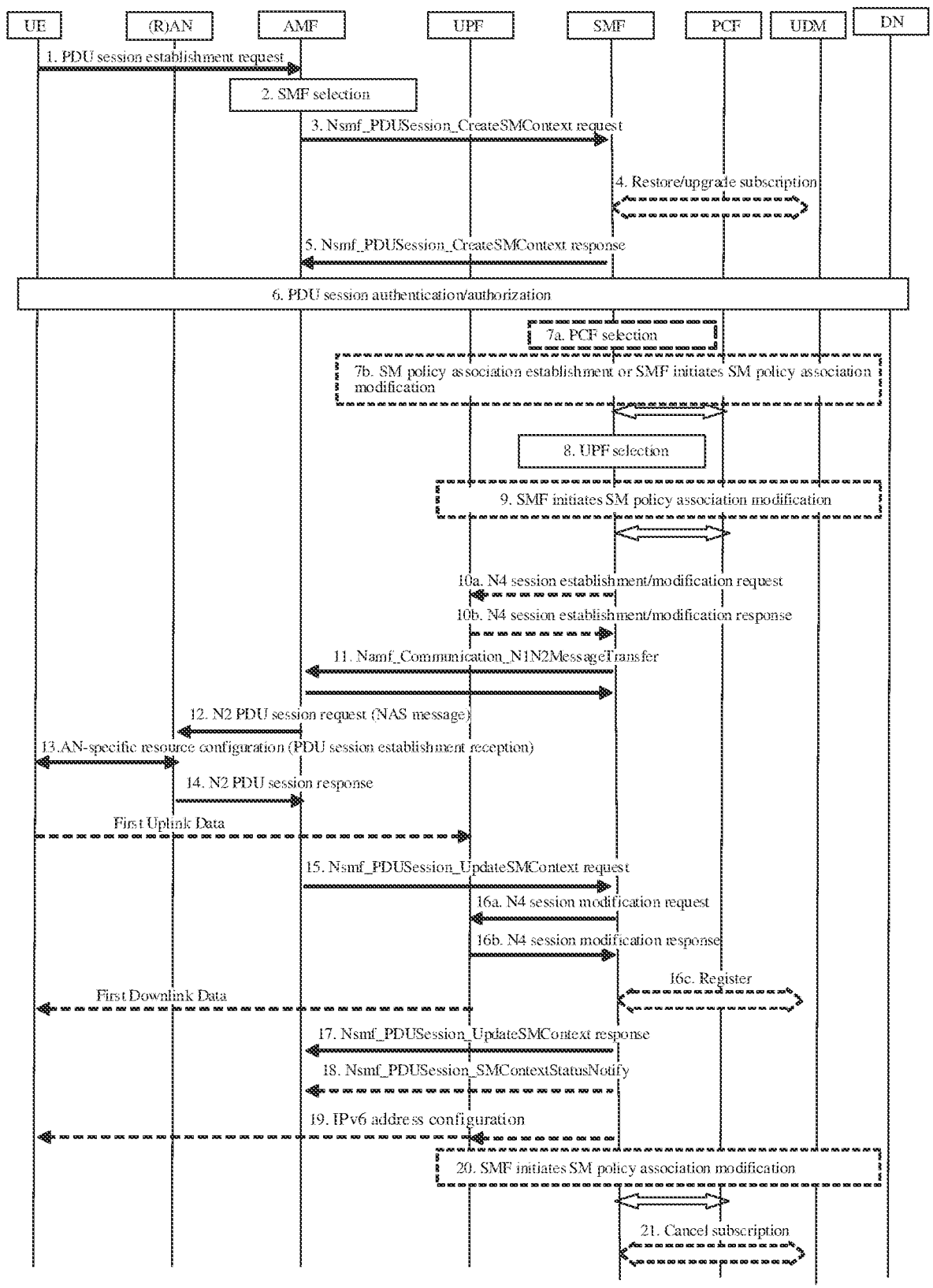
FIG. 18 shows a schematic diagram of a UE requested PDU session establishment procedure according to an example of the present subject matter.

2. Configuration Procedure of the QNC 2.1 PDU Session Establishment Scenario for Non-Roaming and Roaming with Local Breakout:

FIG. 18 shows a schematic diagram of a UE requested PDU session establishment procedure according to an example of the present subject matter.

In step 7b and step 9, the PCF transmits a SM policy association establishment response message to the SMF, or the SMF initiates a SM policy association modification response message. This message carries the control parameter of the QNC.

In the PDU session establishment procedure, a QoS flow (usually one) may be established. This QoS flow may be called a QoS flow with a default QoS rule (not similar to the 4G default bearer, the default QoS flow may not be used for naming in 5G).

Generally, the flow with the default QoS rule may be of the non-GBR type, then the PCF may include the control parameter of the QNC in the PCC rule. In step 7b or step 9 of FIG. 18, if the 5QI in the default QoS rule provided by the PCF may be the NGBR type, the PCF may provide the control parameter of the QCQNC to the SMF.

In step 11 and step 12, the SMF transmits a Namf_Communication_N1N2 information conversion message to the AMF. The control parameter of the QCQNC provided by the PCF may be carried with a QNC profile in this message.

Optionally, subscription data of the UE includes default 5QI and default ARP. If the default 5QI may be the NGBR type, the QNC subscription data may be added.

In step 4, step 7b and step 9, the UDM provides the message including the QNC subscription data to the SMF, and the SMF provides the QNC subscription data to the PCF. Then, the default QoS rule provided by the PCF includes the control parameter of the QNC.

The PDU session establishment procedure may be applied to a PDU session handover from N3GPP to 3GPP. If the PCF provides the control parameter of the QNC for any non-GBR QOS flow in step 7b or step 9, similar to what is described previously, the control parameter of the QNC may be added in step 11 and step 12.

There may include processing a plurality of non-GBR QoS flows.

The parameter related to the SM in the N2 message in step 12 may be included in step 11, so the control parameter of the QNC may be included in step 11.

2.2 Home-Routed Roaming Scenario

Figure 19:
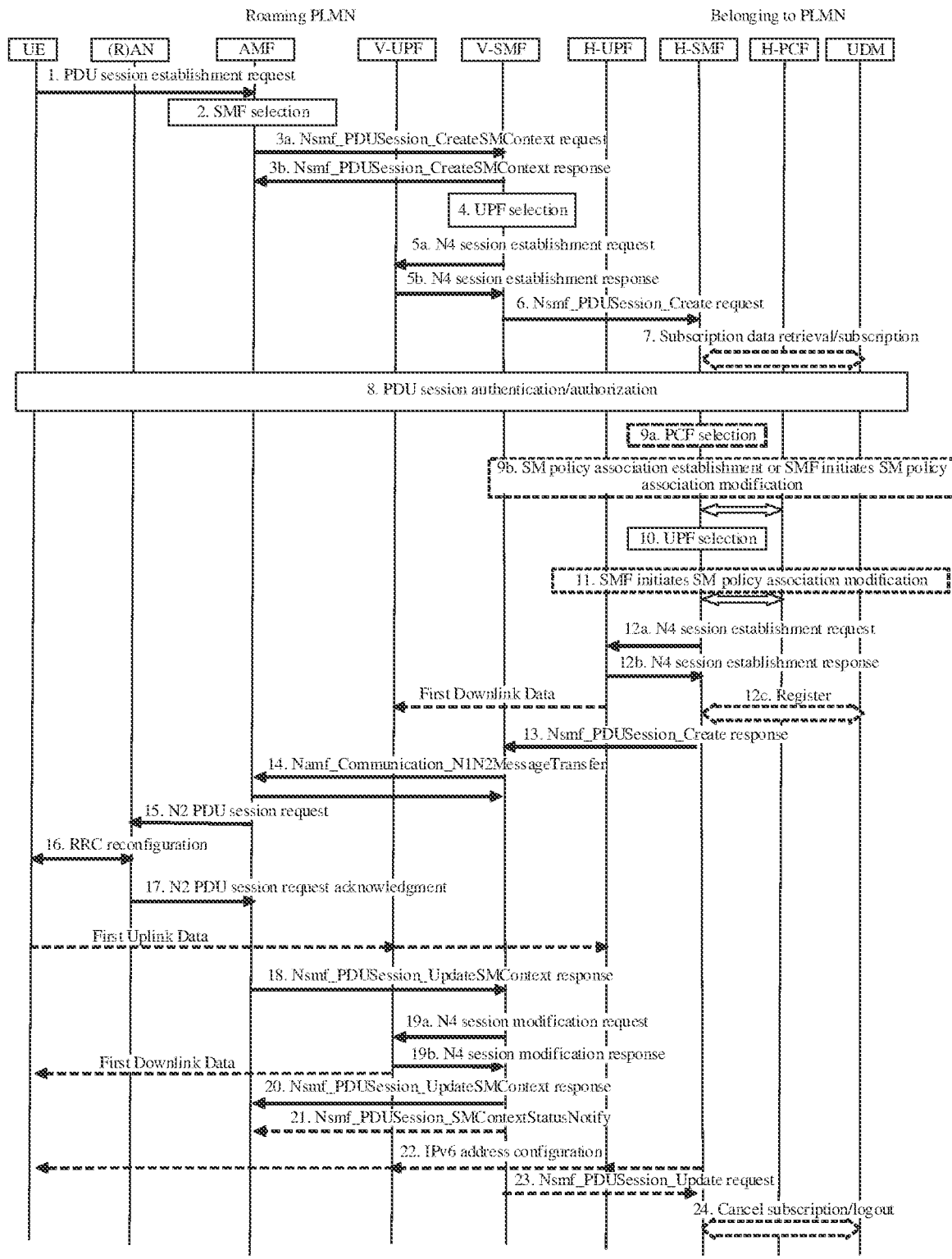
FIG. 19 shows a flowchart of a UE requested PDU session establishment procedure for a home-routed roaming scenario according to an example of the present subject matter.

FIG. 19 shows a flowchart of a UE requested PDU session establishment procedure for a home-routed roaming scenario according to an example of the present subject matter.

In the PDU session establishment procedure, a QoS flow (usually one) may be established. This QoS flow may be called a QoS flow with a default QoS rule (not similar to the 4G default bearer, the default QoS flow may not be used for naming in 5G).

Generally, the flow with the default QoS rule may be of the non-GBR type, then the PCF may include the control parameter of the QNC in the PCC rule. In step 9b or step 11 of FIG. 19, if the 5QI in the default QoS rule provided by the PCF may be the non-GBR type, the PCF may provide the control parameter of the QCQNC. Then, the QNC profile may be added into the message in step 13, step 14, and step 15.

Optionally, subscription data of the UE includes default 5QI and default ARP. If the default 5QI may be the NGBR type, the QNC subscription data may be added.

In step 7, step 9b and step 11, the UDM provides the message including the QNC subscription data to the SMF, and the SMF provides the QNC subscription data to the PCF. Then, the default QoS rule provided by the PCF includes the control parameter of the QNC.

Figure 20:
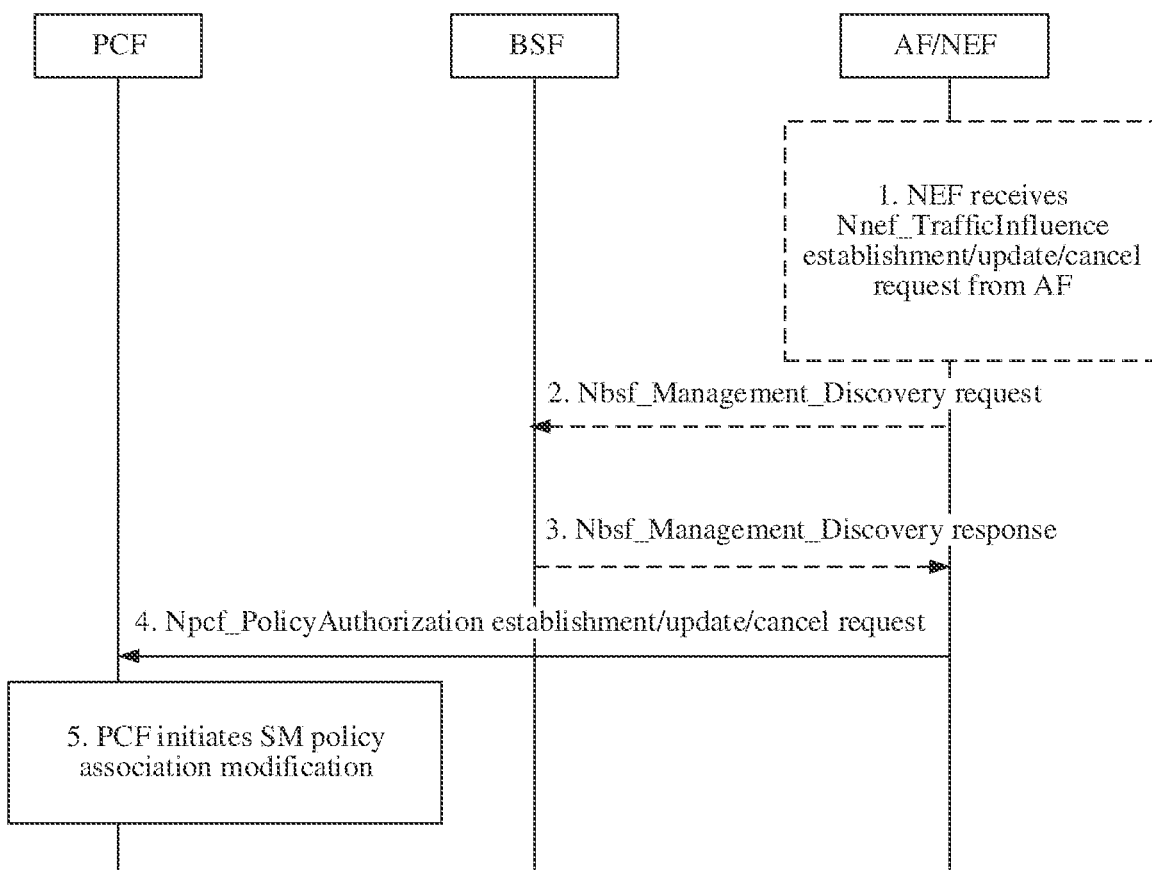
FIG. 20 shows a schematic diagram of a procedure in which an AF request for a single UE address is transferred to a related PCF according to an example of the present subject matter.
Figure 21:
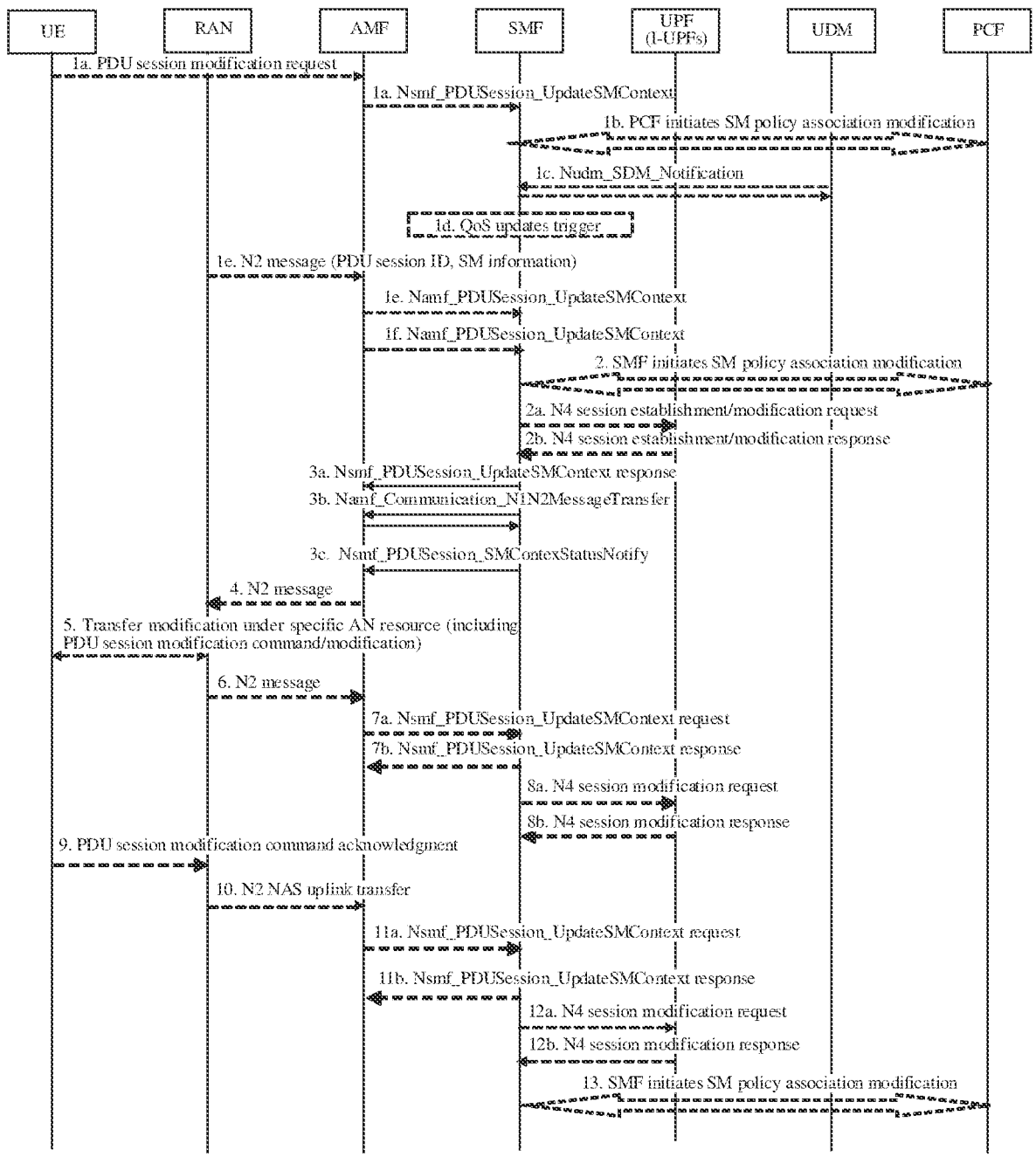
FIG. 21 shows a schematic diagram of a UE or network requested PDU session modification procedure for non-roaming and roaming with local breakout according to an example of the present subject matter.

2.3 AF-Triggered QoS Flow Establishment Procedure for Non-Roaming and Roaming with Local Breakout Scenario FIG. 20 shows a schematic diagram of a procedure in which an AF request for a single UE address may be transferred to a related PCF according to an example of the present subject matter. FIG. 21 shows a schematic diagram of a UE or network requested PDU session modification procedure for non-roaming and roaming with local breakout according to an example of the present subject matter.

In step 4 of FIG. 20, the AF transmits an Npcf_PolicyAuthorization_Create/Update message to the PCF. One or more pieces of media component information included in this message may be added with the control parameter of the QNC. As mentioned earlier, if a media component includes the control parameter of the QNC, it indicates that this media may be transmitted on a non-GBR QOS flow (NGBF); and if a media component does not include the parameter of the QCQNC, it indicates that this media may be transmitted on an NGBF or on a GBF.

In step 1b of FIG. 21, the PCF transmits an Npcf_SM-PolicyControlUpdateNotify request message. In the request message, the control parameter of the QNC may be added into the PCC rule of (one or more) service data flow (SDF, one SDF corresponding to one media flow provided by the AF).

Correspondingly, the message in step 3b and step 4 of FIG. 21 carries the control parameter of the QNC.

AF-Triggered QoS Flow Establishment Procedure for Home-Routed Roaming Scenario

Figure 22:
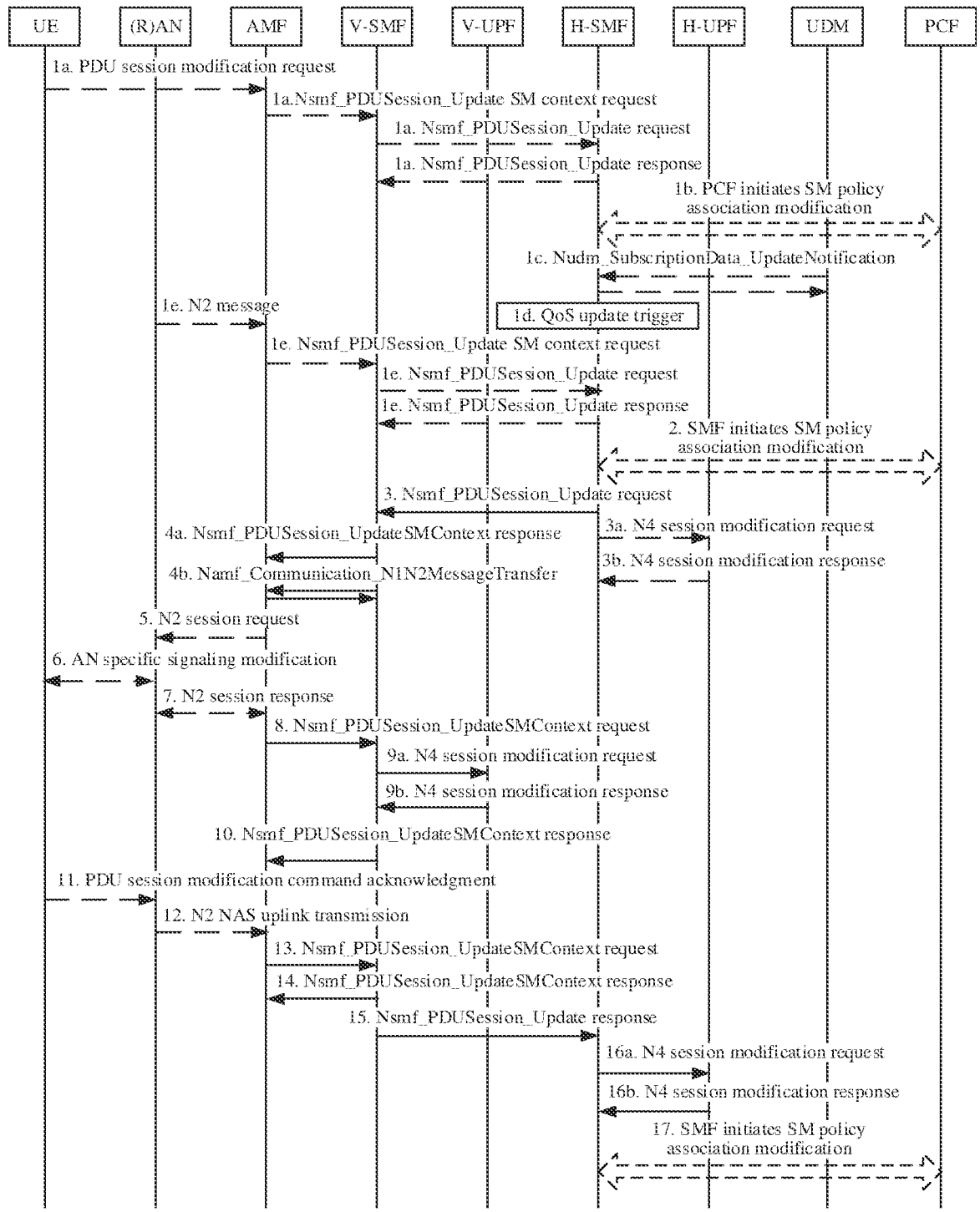
FIG. 22 shows a schematic diagram of a UE or network requested PDU session establishment procedure for home-routed roaming according to an example of the present subject matter.

FIG. 22 shows a schematic diagram of a UE or network requested PDU session establishment procedure for home-routed roaming according to an example of the present subject matter.

In step 1b, step 3, step 4b and step 5 of FIG. 22, control parameters (namely each possible service flow, SDF, QoS flow) of one or more QNCs may be added.

The step 3 of FIG. 22 may be a new step with respect to the scenario described in FIG. 21, namely adding the control parameters of the QNCs to the QoS parameters of one or more QoS flows.

Figure 23:
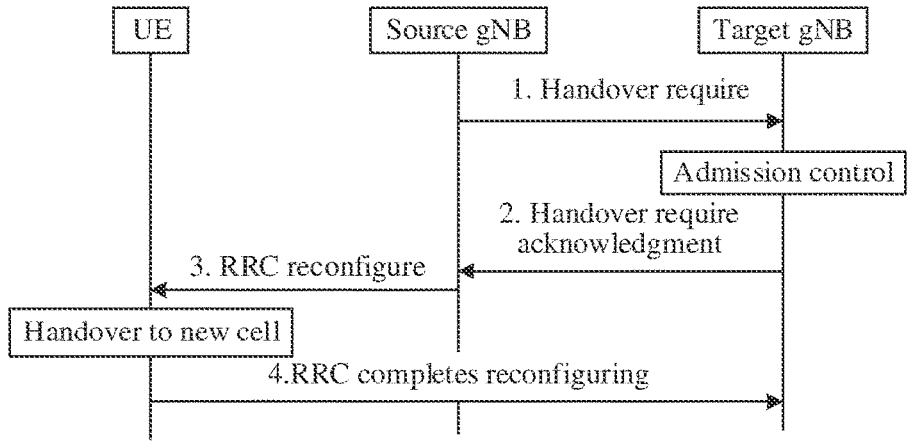
FIG. 23 shows a schematic diagram of a handover process within a base station according to an example of the present subject matter.
Figure 24:
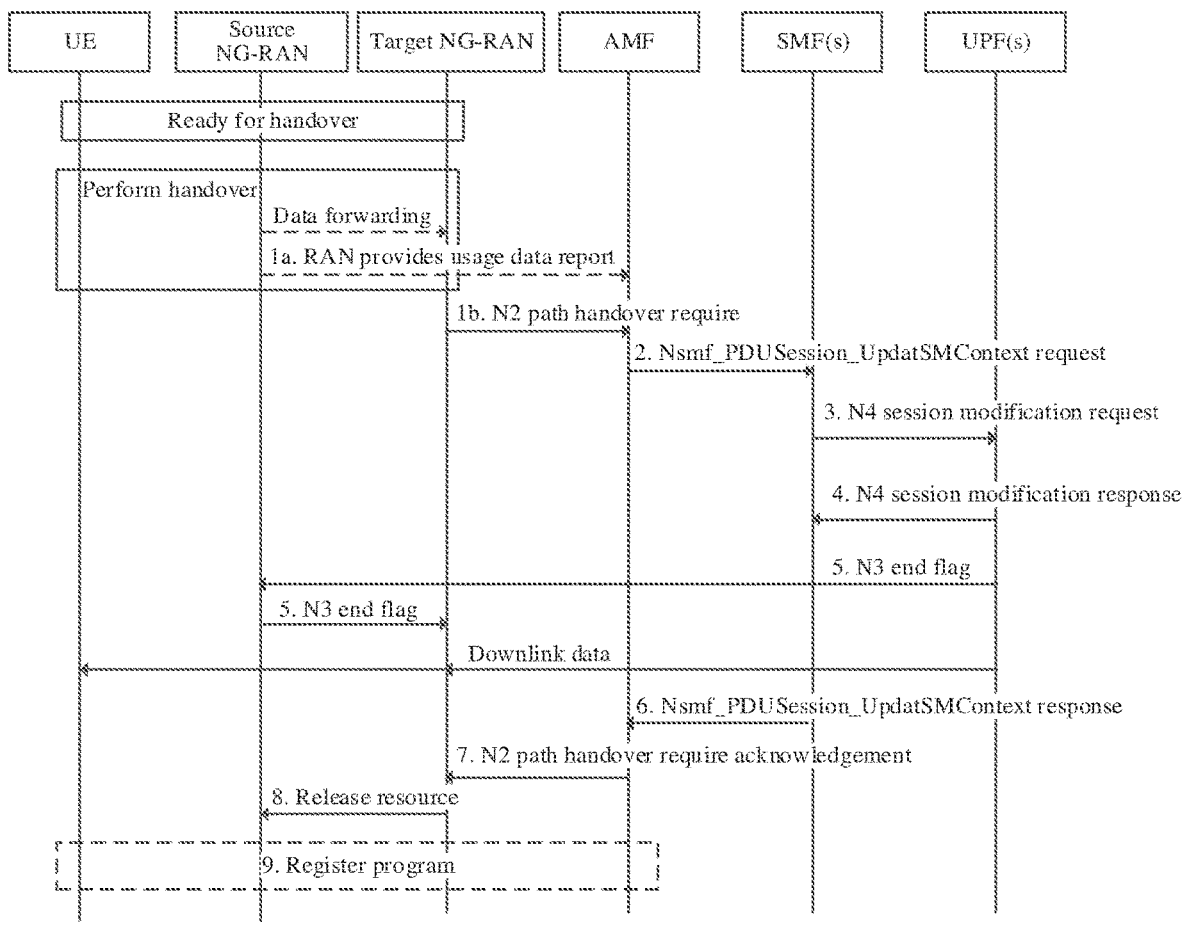
FIG. 24 shows a schematic diagram of a Xn-based inter NG-RAN handover process without UPF reallocation according to another example of the present subject matter.

3. QoS Notification During the Handover Process
3.1 Handover Scenario Over Xn Interface FIG. 23 shows a schematic diagram of a handover process within a base station according to an example of the present subject matter. FIG. 24 shows a schematic diagram of a Xn-based inter NG-RAN handover process without UPF reallocation according to the present subject matter.

In step 1 of FIG. 23, the control parameter of the QNC of the non-GBR bearer flow may be added. Since there may be a plurality of QoS flows in the same UE, for any QoS flow with the control parameter of the QNC in the source gNB, the control parameter of the QNC need to be provided to the target gNB.

Figure 25:
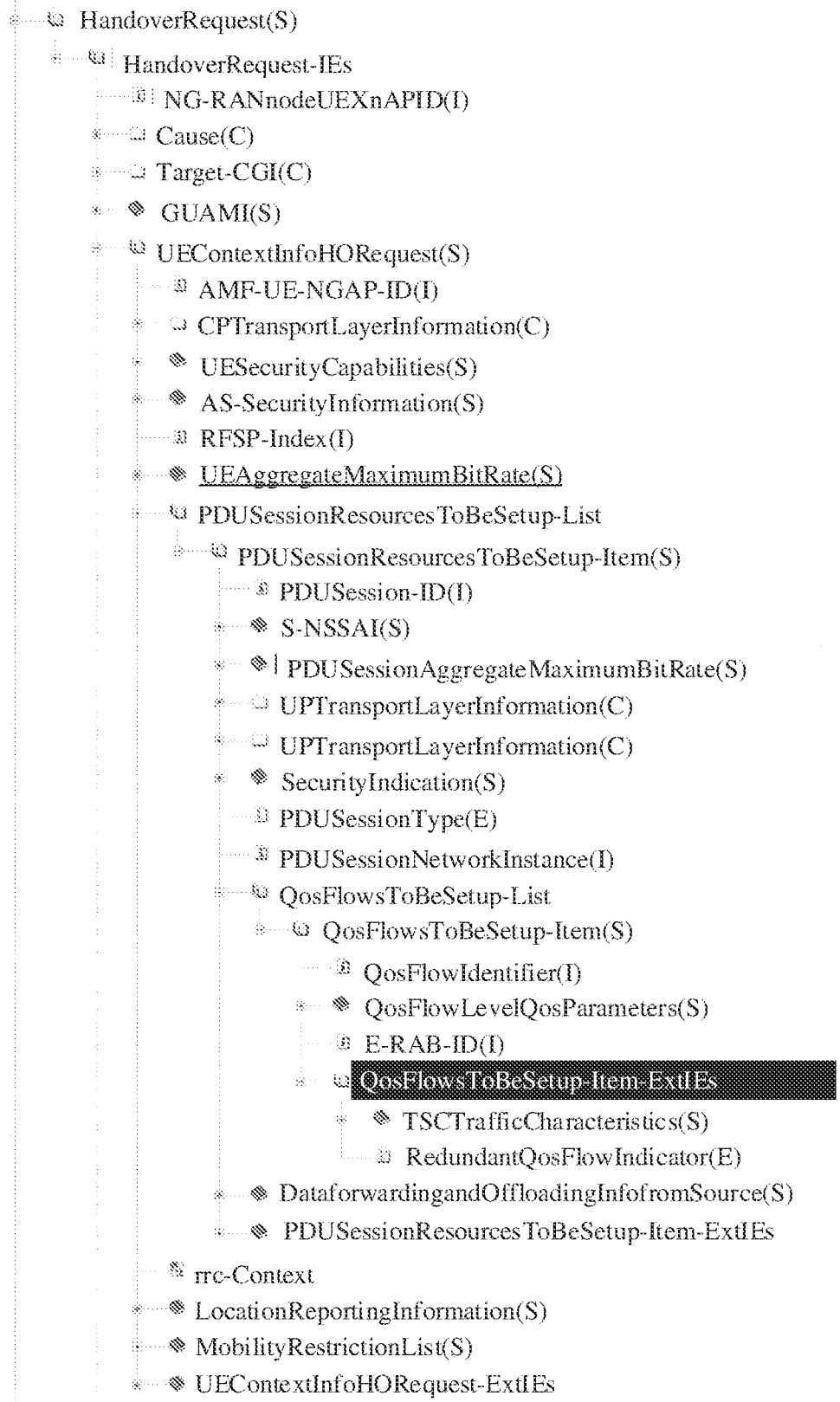
FIG. 25 shows a diagram of a message structure of a handover request according to an example of the present subject matter.

The first parameter value may be carried in the QoSFlowsToBeSetup-Item field, as shown in FIG. 25, in the handover requirement.

In addition, in order to support the subsequent notification procedure of the QNC, the source gNB also needs to report the parameter value corresponding to each parameter of the QNC at the current source side, namely the first parameter value. After the UE may be successfully handed over to the target gNB, the target gNB may have a much better or much worse resource status than the source side gNB. In this way, after the UE may be successfully handed over to the target gNB, the target gNB may determine whether to report the notification message.

3.2 NG-RAN Node N2 Based Handover Preparation Scenario

Figure 26:
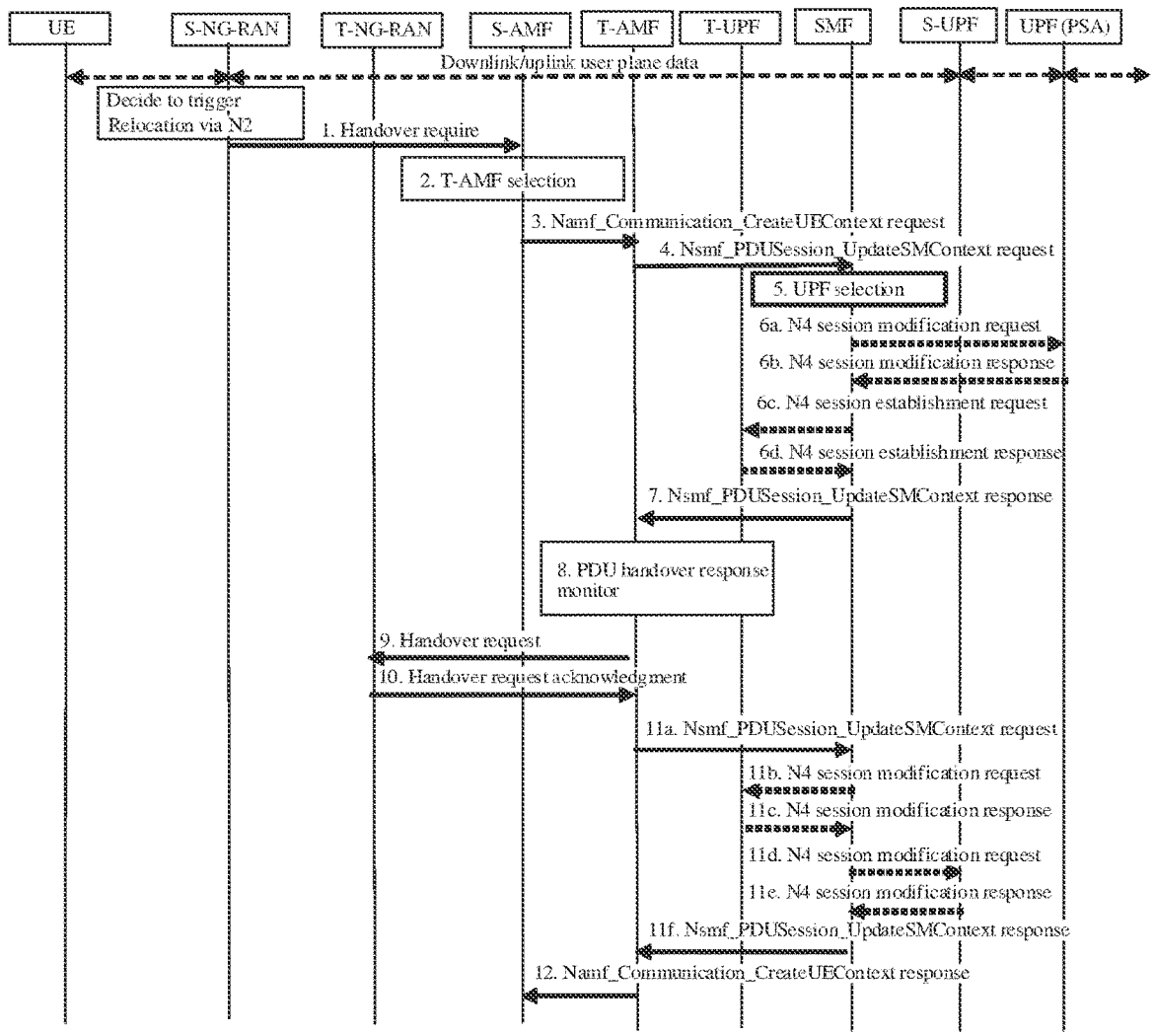
FIG. 26 shows a schematic diagram of an NG-RAN node N2 based handover process according to another example of the present subject matter.

In step 1, step 3, step 4, step 7 and step 9 of FIG. 26, the control parameter of the QNC may be added. Since there may be a plurality of QFs, this needs to be done for any QoS flow that has the control parameter of the QNC at the source gNB. Actually, this procedure may be to transmit the QNC control parameters of all QoS flows on the source NG-RAN to the target NG-RAN through a plurality of steps.

Similarly, in order to support the subsequent notification procedure of the QNC, the source gNB also needs to report each value corresponding to the parameter of the QNC at the current source side, namely the first parameter value. After the UE may be successfully handed over to the target gNB, the target gNB may have a much better or much worse resource status than the source side gNB. In this way, after the UE may be successfully handed over to the target gNB, the target gNB may determine whether to report the notification message. Therefore, in step 1, step 3, step 4, step 7 and step 9 in the left figure, the current values of the parameters of the QNCs of all QoS flows on the source NG-RAN may be added.

Figure 27:
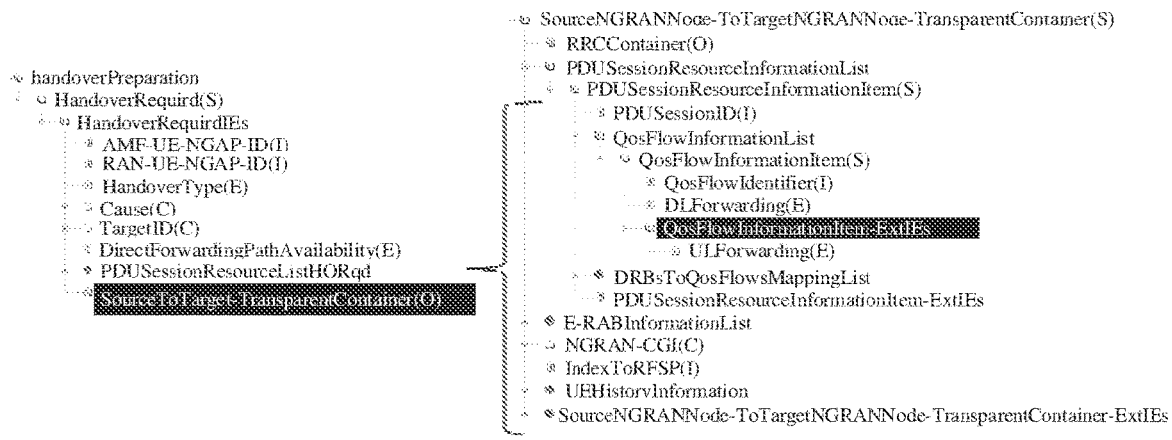
FIG. 27 shows a diagram of a message structure of a handover requirement according to an example of the present subject matter.

FIG. 27 shows a diagram of a message structure of a source-to-target transparent container in a handover response, and the first parameter value may be carried in the source-to-target transparent container. FIG. 28 shows a QoSFlowSetupRequestItem field in a handover requirement, and the control parameter of the QNC may be carried in the require field.

Handover from Non-3GPP to 3GPP Scenario

Figure 29:
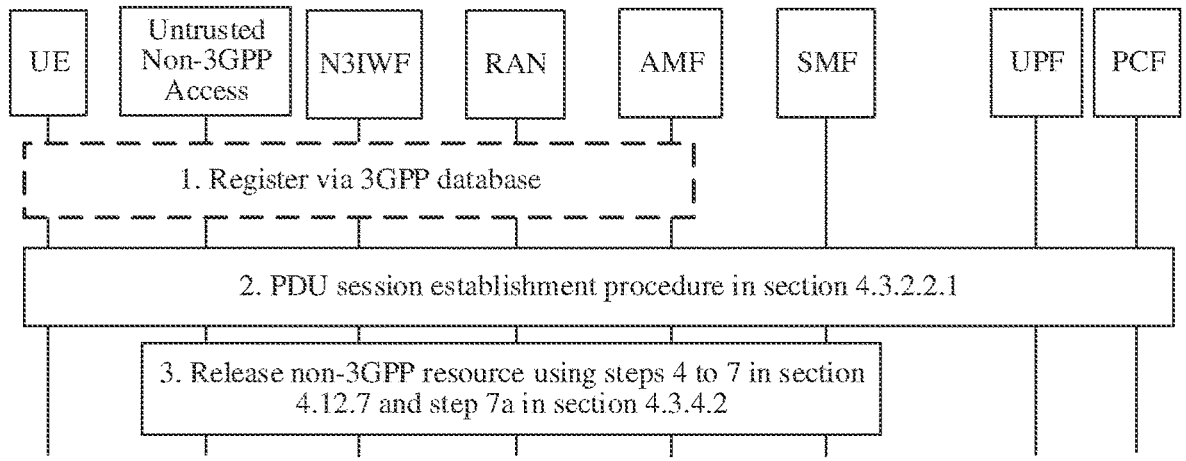
FIG. 29 shows a schematic diagram of a handover process (non-roaming and roaming with local breakout) of a PDU session procedure from untrusted non-3GPP to 3GPP access according to an example of the present subject matter.
Figure 30:
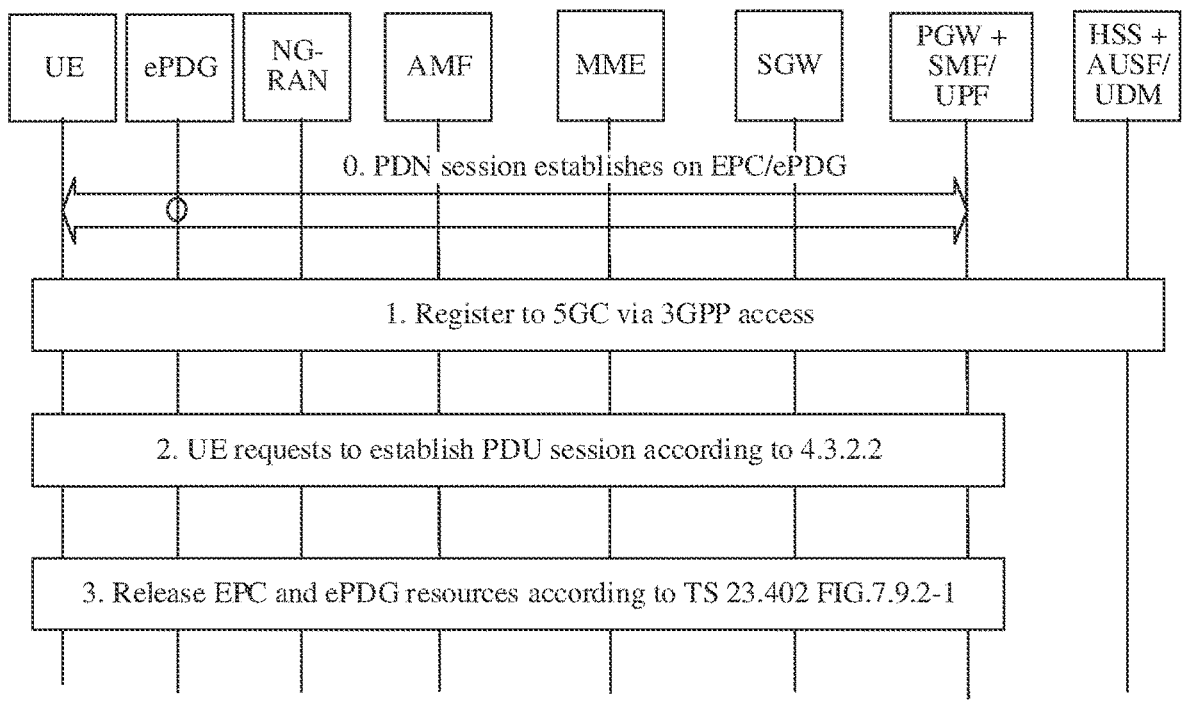
FIG. 30 shows a schematic diagram of a handover from EPC/ePDG to 5GS according to an example of the present subject matter.

FIG. 29 shows a schematic diagram of a handover process (non-roaming and roaming with local breakout) of a PDU session procedure from untrusted non-3GPP to 3GPP access. FIG. 30 shows a schematic diagram of a handover from EPC/ePDG to 5GS.

As can be seen from FIG. 29, the handover from 5G non-3GPP to 5GS or from 4G non-3GPP to 5GS uses the PDU session establishment procedure, which may be defined in the foregoing examples. Therefore, the QNC processing in the handover process from non-3GPP to 3GPP can be implemented by using the foregoing examples.

Figure 31:
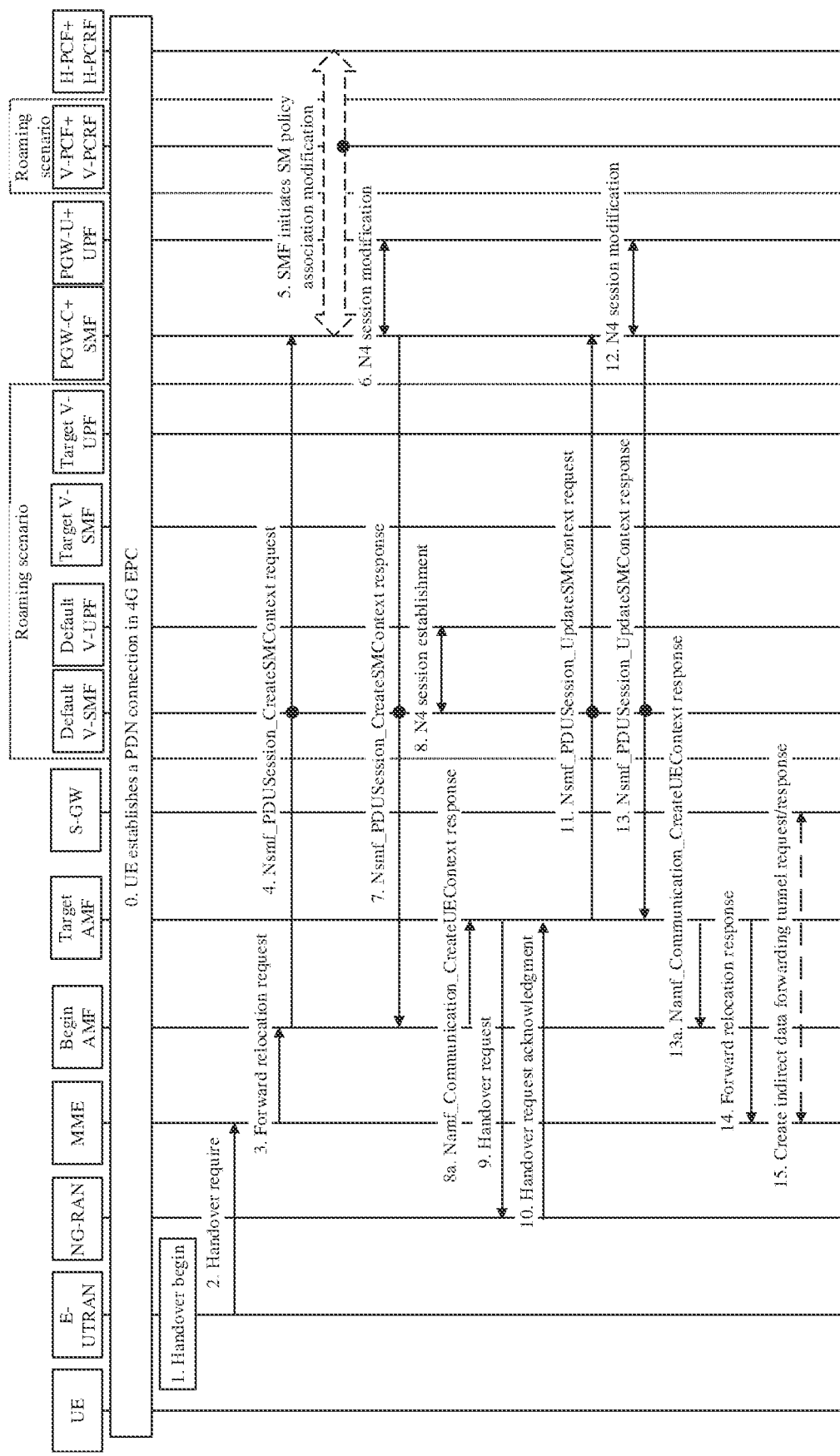
FIG. 31 shows a schematic diagram of a preparation phase of interworking based on single registration from EPS to 5GS according to an example of the present subject matter.

FIG. 31 shows a schematic diagram of a preparation phase of interworking based on single registration from EPS to 5GS.

This example may be processed in a similar way as FIG. 26. Only step 2 and step 3 need to be modified to processing a response message in a 5G system. That is, in a case of a handover from 4G to 5GS, if 4G also supports the QCQNC, the 4G protocol needs to be updated.

The method according to the examples of the present subject matter may also be applied to a 4G system. When being applied to the 4G system, the NR-gNB may be replaced with the eNB. There may be no change to the interaction between the PCF and the AF. The interaction between the SMF and the PCF may be modified to the interaction between the PGW and the PCF. The 5G QoS Flow may be replaced by the 4G EPS bearer. The 5G 5QI may be replaced by the 4G QCI. The interaction between the RAN and the AMF/SMF in 5G may be replaced by the interaction between the RAN and the MME in 4G.

Figure 32:
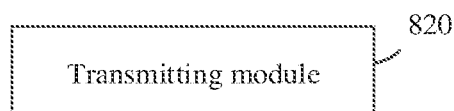
FIG. 32 shows a block diagram of a handover process-based message transmitting apparatus during a handover process according to another example of the present subject matter.

FIG. 32 shows a block diagram of a handover process-based message transmitting apparatus according to an example of the present subject matter. The apparatus includes:

a transmitting module 820, configured to transmit a control parameter of QNC of a non-GBR bearer flow to a target access network device during a handover process, so that the target access network device transmits a notification message to an application entity via a core network entity, in a case that a change in a parameter value of the QNC of the non-GBR bearer flow after the handover may be completed meets a reporting condition.

The control parameter of the QNC may be used for indicating a parameter of the QNC of the non-GBR bearer flow and the reporting condition.

In a possible design of this example, the transmitting module 920 may be configured to transmit, by the source access network device, the control parameter of the QNC of the non-GBR bearer flow to the target access network device via the core network entity during the handover process.

In a possible design of this example, the transmitting module 920 may be configured to transmit a handover requirement to the core network entity during the handover process, the handover requirement carrying the control parameter of the QNC.

In a possible design of this example, the control parameter of the QNC may be carried in a source-to-target transparent container field in the handover requirement.

In a possible design of this example, the transmitting module 920 may be configured to transmit a first parameter value to the target access network device during the handover process, so that the target access network device transmits the notification message to the application entity via the core network entity, in a case that a change from the first parameter value to a second parameter value meets the reporting condition;

the first parameter value is a parameter value of the parameter of the QNC before the handover, and the second parameter value may be a parameter value of the parameter of the QNC after the handover.

In a possible design of this example, the first parameter value may be carried in a source-to-target transparent container field in the handover requirement.

In a possible design of this example, the parameter of the QNC includes at least one of the following:
packet delay budget (PDB);
packet error rate (PER); and
current bit rate (CBR).

In a possible design of this example, the reporting condition includes at least one of the following:
a change value of the parameter value of the QNC in a first duration may be greater than a first threshold;
a change rate of the parameter value of the QNC in a second duration may be greater than a second threshold;
the change value of the parameter value of the QNC in the first duration may be greater than the first threshold, and maintains for a third threshold; and
the change rate of the parameter value of the QNC in the second duration may be greater than the second threshold, and maintains for a fourth threshold.

Figure 33:
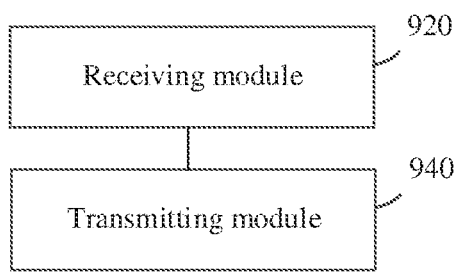
FIG. 33 shows a block diagram of a handover process-based message transmitting apparatus during a handover process according to an example of the present subject matter.

FIG. 33 shows a block diagram of a handover process-based message transmitting apparatus according to an example of the present subject matter. The apparatus includes:

a receiving module 920, configured to receive a control parameter of QNC during a handover process, the control parameter of the QNC indicates a parameter of the QNC of a non-GBR bearer flow and a reporting condition; and a transmitting module 940, configured to, after the handover may be completed, transmit a notification message to an application entity via a core network entity, in a case that a change in a parameter value of the QNC of the non-GBR bearer flow meets the reporting condition.

In a possible design of this example, the receiving module 920 may be configured to receive the control parameter of the QNC from a source access network device during the handover process; and/or receive the control parameter of the QNC from the core network entity during the handover process.

In a possible design of this example, the receiving module 920 may be configured to receive, by the target access network device, a handover request transmitted from a core network device during the handover process, the handover request carrying the control parameter of the QNC from the source access network device.

In a possible design of this example, the control parameter of the QNC from the source access network device may be carried in a source-to-target transparent container field in the handover request.

In a possible design of this example, the receiving module 920 may be configured to receive a handover request transmitted by a core network device during the handover process, the handover request carrying the control parameter of the QNC from the core network entity.

In a possible design of this example, the control parameter of the QNC from the core network entity may be carried in a QoS establishment request field in the handover request.

In a possible design of this example, the method further includes:
preferentially using the control parameter of the QNC from the core network entity, in a case that the control parameter of the QNC from the source access network device may be inconsistent with the control parameter of the QNC from the core network entity.

In a possible design of this example, the receiving module 920 may be configured to receive a first parameter value of the source access network device during the handover process; and the transmitting module 940 may be configured to, after the handover may be completed, transmit the notification message to the application entity via the core network entity, in a case that a change from the first parameter value to a second parameter value meets the reporting condition;

the first parameter value is a parameter value of the parameter of the QNC before the handover, and the second parameter value may be a parameter value of the parameter of the QNC after the handover.

In a possible design of this example, the receiving module 920 may be configured to receive the first parameter value transmitted by the source access network device during the handover process; and the transmitting module 940 may be configured to, after the handover may be completed, transmit, by the target access network device, the notification message to the application entity via the core network entity, in a case that a change from the first parameter value to a second parameter value meets the reporting condition;

the first parameter value is a parameter value of the parameter of the QNC before the handover, and the second parameter value may be a parameter value of the parameter of the QNC after the handover.

Figure 34:
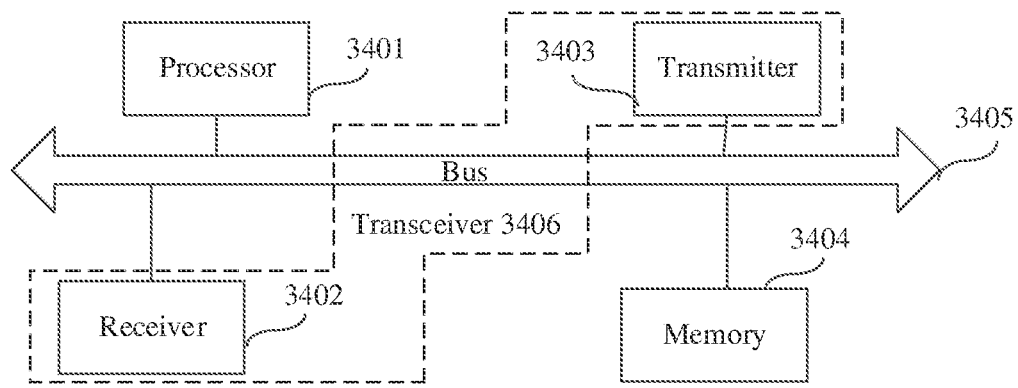
FIG. 34 shows a block diagram of a network element device according to an example of the present subject matter.

FIG. 34 shows a schematic structural diagram of a network element device according to another example of the present subject matter. For example, the network element device may be used to execute the control method of the application program described above. Specifically, the network element device 3400 may include: a processor 3401, a receiver 3402, a transmitter 3403, a memory 3404 and a bus 3405.

The processor 3401 includes one or more processing cores. The processor 3401 runs a software program and a module to execute various functional applications and perform information processing.

The receiver 3402 and the transmitter 3403 may be implemented as a transceiver 3406, which may be a communication chip.

The memory 3404 may be connected to the processor 3401 through the bus 3405.

The memory 3404 may be configured to store a computer program. The processor 3401 may be configured to execute the computer program, to implement each step performed by the network element device, the access network device entity, the core network element, or the core network entity in the foregoing method examples.

The transmitter 3403 may be configured to perform the steps related to transmitting in the foregoing examples. The receiver 3402 may be configured to perform the steps related to receiving in the foregoing examples. The processor 3401 may be configured to perform the steps other than the transmitting and receiving steps in the foregoing examples.

In addition, the memory 3404 may be implemented by using any type of volatile or non-volatile storage device or a combination thereof. The volatile or non-volatile storage device includes but may not be limited to: a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device.

In an example, a network element device may be further provided, and the network element device includes: a processor and a memory, the memory storing a computer program, and the computer program being loaded and executed by the processor to implement the handover process-based message transmitting method described above.

The term module (and other similar terms such as unit, subunit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The present subject matter further provides a non-transitory computer-readable storage medium, the storage medium storing at least one instruction, at least one program, a code set or an instruction set, and the at least one instruction, the at least one program, the code set or the instruction set being loaded and executed by a processor to implement the handover process-based message transmitting method according to the foregoing method examples.

Optionally, the present subject matter further provides a computer program product, the computer program product including computer instructions, the computer instructions being stored in a non-transitory computer-readable storage medium. A processor of a computer device reads the computer instructions from the computer-readable storage medium and executes the computer instructions to cause the computer device to perform the handover process-based message transmitting method provided in the foregoing aspect.

What is claimed is:

1. A handover process-based message transmitting method, comprising:
   transmitting, by a source access network device, a control parameter of quality of service (QoS) notification control (QNC) of a non-guaranteed bit rate (GBR) bearer flow to a target access network device during a handover process so that the target access network device transmits a notification message to an application entity via a core network entity in a case that a change in a parameter value of the QNC of the non-GBR bearer flow after the handover is completed meets a reporting condition, wherein
   the control parameter of the QNC indicates a parameter of the QNC of the non-GBR bearer flow and the reporting condition.

2. The method according to claim 1, wherein
   the transmitting, by a source access network device, a control parameter of QNC of a non-GBR bearer flow to a target access network device during a handover process comprises:
   transmitting, by the source access network device, the control parameter of the QNC of the non-GBR bearer flow to the target access network device via the core network entity during the handover process.

3. The method according to claim 2, wherein
   the transmitting, by the source access network device, the control parameter of the QNC of the non-GBR bearer flow to the target access network device via the core network entity during the handover process comprises:
   transmitting, by the source access network device, a handover requirement to the core network entity during the handover process, the handover requirement carrying the control parameter of the QNC.

4. The method according to claim 3, wherein
   the control parameter of the QNC is carried in a source-to-target transparent container field in the handover requirement.

5. The method according to claim 3, further comprising:
   transmitting, by the source access network device, a first parameter value to the target access network device during the handover process so that the target access network device transmits the notification message to the application entity via the core network entity in a case that a change from the first parameter value to a second parameter value meets the reporting condition, wherein
   the first parameter value is a parameter value of the parameter of the QNC before the handover, and
   the second parameter value is a parameter value of the parameter of the QNC after the handover.

6. The method according to claim 5, wherein
the first parameter value is carried in a source-to-target transparent container field in the handover requirement.

7. The method according to claim 1, wherein
the parameter of the QNC comprises at least one of the following:
packet delay budget (PDB);
packet error rate (PER); or
current bit rate (CBR).

8. The method according to claim 1, wherein
the reporting condition comprises at least one of the following:
a change value of the parameter value of the QNC in a first duration is greater than a first threshold;
a change rate of the parameter value of the QNC in a second duration is greater than a second threshold;
the change value of the parameter value of the QNC in the first duration is greater than the first threshold, and maintains for a third threshold;
the change rate of the parameter value of the QNC in the second duration is greater than the second threshold, and maintains for a fourth threshold; or
the third threshold and the fourth threshold being thresholds used for measuring maintaining durations.

9. A network element device, comprising:
a processor; and
a memory in communication with the processor and storing a computer program executable by the processor to configure the network element device to implement the handover process-based message transmitting method according to claim 1.

10. The device according to claim 9, wherein
the transmitting, by a source access network device, a control parameter of QNC of a non-GBR bearer flow to a target access network device during a handover process comprises:
transmitting, by the source access network device, the control parameter of the QNC of the non-GBR bearer flow to the target access network device via the core network entity during the handover process.

11. The device according to claim 10, wherein
the transmitting, by the source access network device, the control parameter of the QNC of the non-GBR bearer flow to the target access network device via the core network entity during the handover process comprises:
transmitting, by the source access network device, a handover requirement to the core network entity during the handover process, the handover requirement carrying the control parameter of the QNC.

12. The device according to claim 11, wherein
the control parameter of the QNC is carried in a source-to-target transparent container field in the handover requirement.

13. The device according to claim 11, wherein the computer program executable by the processor to configure the network element device to implement:
transmitting, by the source access network device, a first parameter value to the target access network device during the handover process so that the target access network device transmits the notification message to the application entity via the core network entity in a case that a change from the first parameter value to a second parameter value meets the reporting condition, wherein
the first parameter value is a parameter value of the parameter of the QNC before the handover, and the second parameter value is a parameter value of the parameter of the QNC after the handover.

14. The device according to claim 13, wherein
the first parameter value is carried in a source-to-target transparent container field in the handover requirement.

15. The device according to claim 9, wherein
the parameter of the QNC comprises at least one of the following:
packet delay budget (PDB);
packet error rate (PER); or
current bit rate (CBR).

16. The device according to claim 9, wherein
the reporting condition comprises at least one of the following:
a change value of the parameter value of the QNC in a first duration is greater than a first threshold;
a change rate of the parameter value of the QNC in a second duration is greater than a second threshold;
the change value of the parameter value of the QNC in the first duration is greater than the first threshold, and maintains for a third threshold;
the change rate of the parameter value of the QNC in the second duration is greater than the second threshold, and maintains for a fourth threshold; or
the third threshold and the fourth threshold being thresholds used for measuring maintaining durations.

17. A handover process-based message transmitting apparatus, comprising:
a transmitting module, configured to transmit a control parameter of QNC of a non-GBR bearer flow to a target access network device during a handover process so that the target access network device transmits a notification message to an application entity via a core network entity in a case that a change in a parameter value of the QNC of the non-GBR bearer flow after the handover is completed meets a reporting condition, wherein
the control parameter of the QNC indicates a parameter of the QNC of the non-GBR bearer flow and the reporting condition.

18. The apparatus according to claim 17, wherein the transmitting module is further configured to:
transmit a handover requirement to the core network entity during the handover process, the handover requirement carrying the control parameter of the QNC.

19. The apparatus according to claim 18, wherein
the control parameter of the QNC is carried in a source-to-target transparent container field in the handover requirement.

20. The apparatus according to claim 18, wherein the transmitting module is further configured to:
transmit a first parameter value to the target access network device during the handover process so that the target access network device transmits the notification message to the application entity via the core network entity in a case that a change from the first parameter value to a second parameter value meets the reporting condition, wherein
the first parameter value is a parameter value of the parameter of the QNC before the handover, and the second parameter value is a parameter value of the parameter of the QNC after the handover.

21. The apparatus according to claim 20, wherein
the first parameter value is carried in a source-to-target transparent container field in the handover requirement.

22. The apparatus according to claim 17, wherein the parameter of the QNC comprises at least one of the following:
  packet delay budget (PDB);
  packet error rate (PER); or
  current bit rate (CBR).

23. The apparatus according to claim 17, wherein the reporting condition comprises at least one of the following:
  a change value of the parameter value of the QNC in a first duration is greater than a first threshold;
  a change rate of the parameter value of the QNC in a second duration is greater than a second threshold;
  the change value of the parameter value of the QNC in the first duration is greater than the first threshold, and maintains for a third threshold;
  the change rate of the parameter value of the QNC in the second duration is greater than the second threshold, and maintains for a fourth threshold; or
  the third threshold and the fourth threshold being thresholds used for measuring maintaining durations.

* * * * *